US010484267B2

(12) United States Patent
Gerstel

(10) Patent No.: US 10,484,267 B2
(45) Date of Patent: Nov. 19, 2019

(54) SYSTEMS AND METHODS FOR MANAGING MULTI-LAYER COMMUNICATION NETWORKS

(71) Applicant: SEDONASYS SYSTEMS LTD, Raanana (IL)

(72) Inventor: Ornan Alexander Gerstel, Herzliya (IL)

(73) Assignee: SEDONASYS SYSTEMS LTD, Raanana (IL)

( * ) Notice: Subject to any disclaimer, the term of this patent is extended or adjusted under 35 U.S.C. 154(b) by 49 days.

(21) Appl. No.: 15/561,069

(22) PCT Filed: Mar. 31, 2016

(86) PCT No.: PCT/IL2016/050350
§ 371 (c)(1),
(2) Date: Sep. 25, 2017

(87) PCT Pub. No.: WO2016/157194
PCT Pub. Date: Oct. 6, 2016

(65) Prior Publication Data
US 2018/0262422 A1   Sep. 13, 2018

Related U.S. Application Data

(60) Provisional application No. 62/141,897, filed on Apr. 2, 2015.

(51) Int. Cl.
*H04L 12/703*   (2013.01)
*H04L 12/707*   (2013.01)
(Continued)

(52) U.S. Cl.
CPC .......... *H04L 45/28* (2013.01); *H04L 41/0668* (2013.01); *H04L 45/028* (2013.01);
(Continued)

(58) Field of Classification Search
CPC . H04L 41/0213; H04L 41/0668; H04L 43/08; H04L 45/02; H04L 45/028;
(Continued)

(56) References Cited

U.S. PATENT DOCUMENTS 6,708,000 B1 * 3/2004 Nishi ................. H04J 14/0227
398/1
8,018,860 B1   9/2011 Cook
8,724,984 B1 * 5/2014 Gerstel ............... H04J 14/0267
398/1
2002/0018264 A1   2/2002 Kodialam et al.
(Continued)

*Primary Examiner* — Steven H Nguyen
(74) *Attorney, Agent, or Firm* — Soroker Agmon Nordman

(57) ABSTRACT

A computerized system for performing preparation operations for a maintenance activity that causes a disruption in a communication path of traffic over a multilayer network. The system comprising: a maintenance tool configured to coordinate maintenance activities of the multi-layer network based on maintenance activity-data, a storage unit to store the maintenance activity data; and a multi-layer control system comprising a processor, wherein said processor is configured to: receive from the maintenance tool an indication that one or more maintenance activities are required on an indicated optical resource, determine an affected optical path, determine an affected IP link utilizing said affected optical path; remove traffic from the affected IP link; remove the affected optical path; activate an alternative optical path; configure the packet switching layer to utilize the alternative optical path; and repeat for each alVecied optical path and each affected IP link.

12 Claims, 22 Drawing Sheets

(51) Int. Cl.
*H04L 29/06* (2006.01)
*H04L 12/24* (2006.01)
*H04L 12/759* (2013.01)
*H04L 12/721* (2013.01)
*H04L 12/751* (2013.01)
*H04Q 11/00* (2006.01)
*H04L 12/26* (2006.01)

(52) U.S. Cl.
CPC ............. *H04L 45/22* (2013.01); *H04L 69/16* (2013.01); *H04L 41/0213* (2013.01); *H04L 43/08* (2013.01); *H04L 45/02* (2013.01); *H04L 45/62* (2013.01); *H04Q 2011/0081* (2013.01)

(58) Field of Classification Search
CPC ......... H04L 45/22; H04L 45/28; H04L 45/62; H04L 69/16; H04Q 2011/0081
See application file for complete search history.

(56) References Cited

U.S. PATENT DOCUMENTS

| | | | |
|---|---|---|---|
| 2002/0191247 A1* | 12/2002 | Lu | H04B 10/03 398/79 |
| 2004/0107382 A1* | 6/2004 | Doverspike | H04L 41/0663 714/4.1 |
| 2004/0205237 A1* | 10/2004 | Doshi | H04L 41/0668 709/241 |
| 2005/0063299 A1* | 3/2005 | Atkinson | H04J 14/0227 370/216 |
| 2005/0276231 A1 | 12/2005 | Ayyagari | |
| 2006/0013210 A1* | 1/2006 | Bordogna | H04L 45/00 370/389 |
| 2011/0116789 A1* | 5/2011 | Wellbrock | H04J 14/0279 398/5 |
| 2013/0242725 A1 | 9/2013 | Rabie et al. | |
| 2015/0023663 A1* | 1/2015 | Gerstel | H04Q 11/0005 398/49 |
| 2016/0087849 A1* | 3/2016 | Balasubramanian | H04L 41/12 709/221 |

* cited by examiner

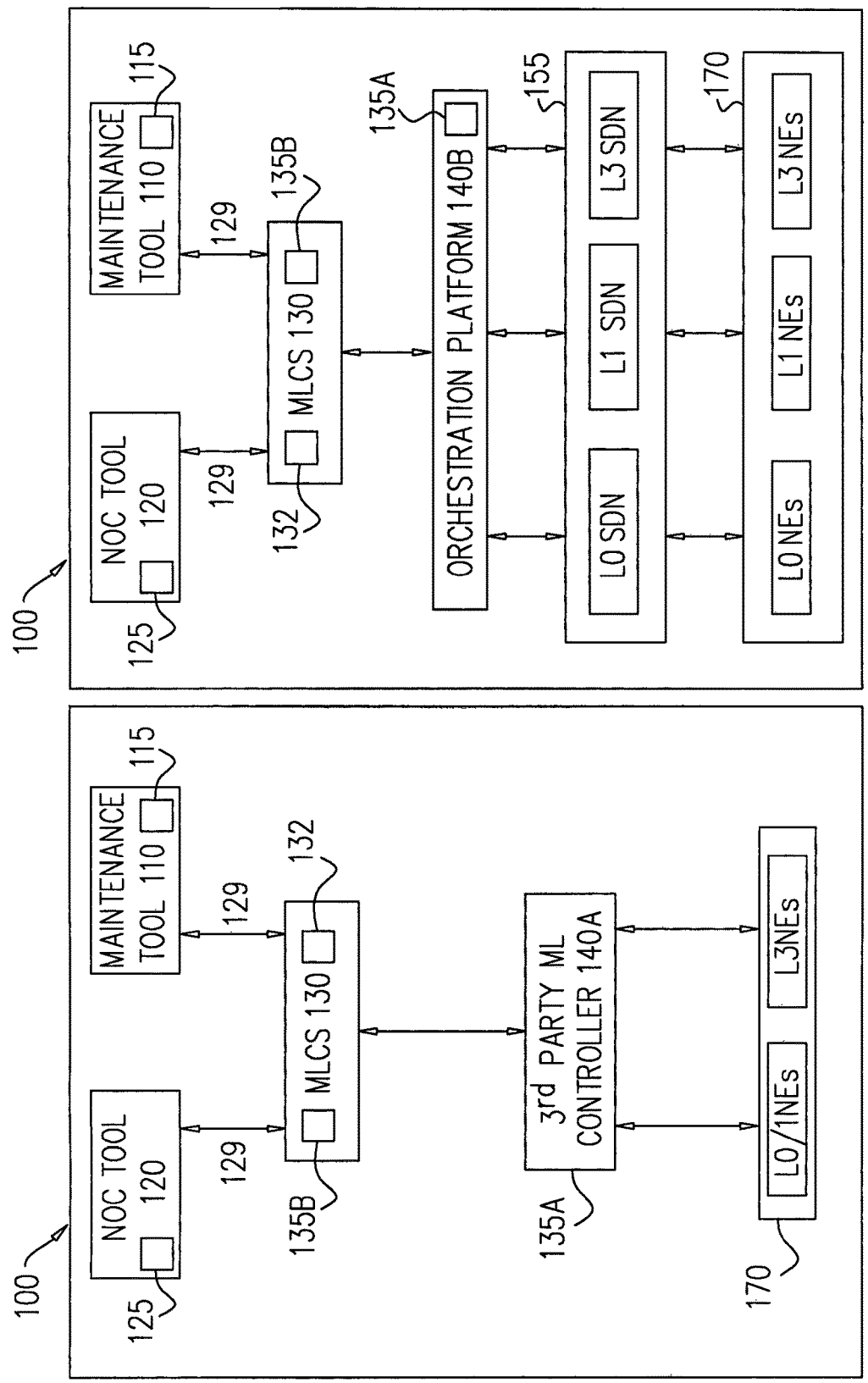

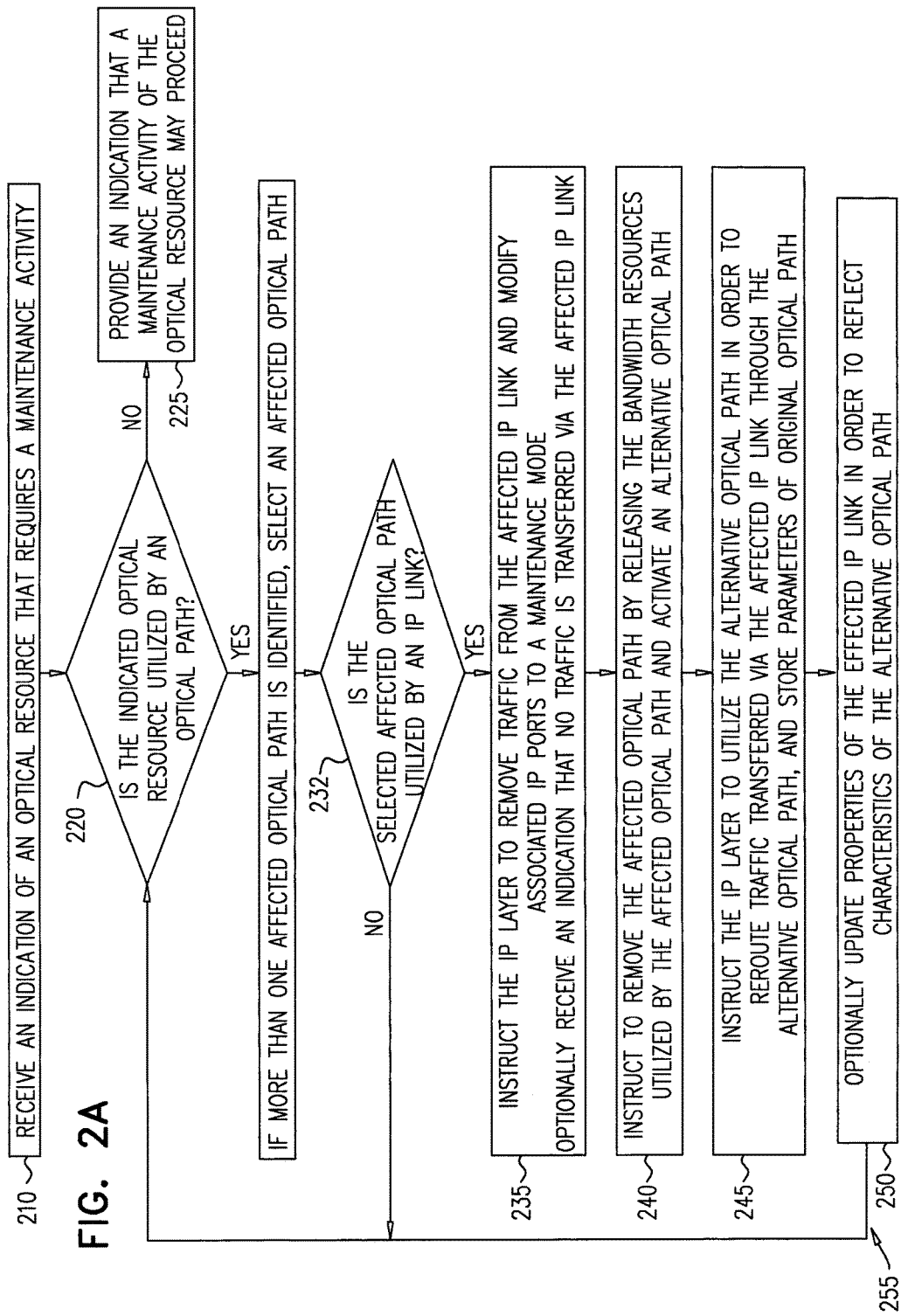

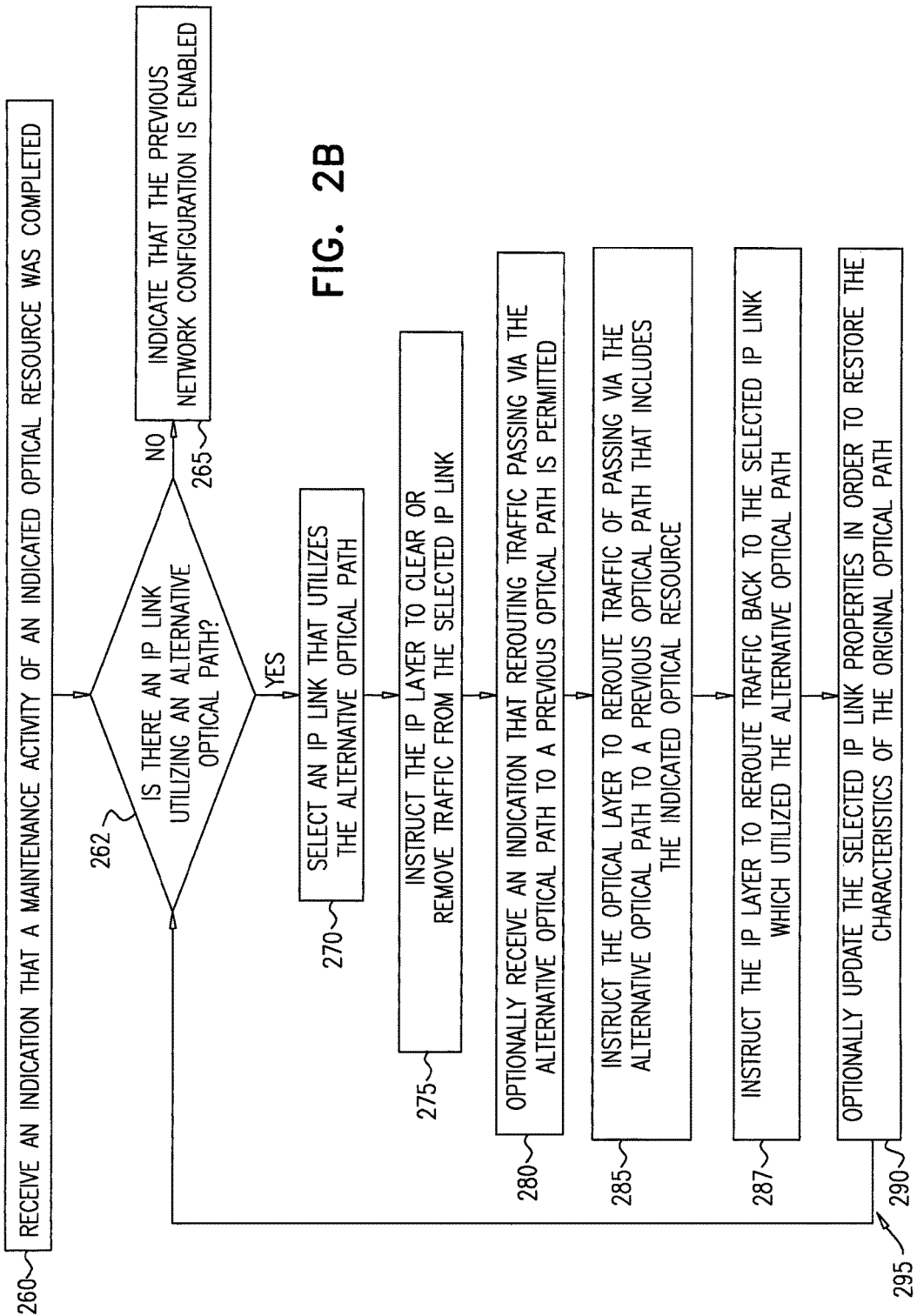

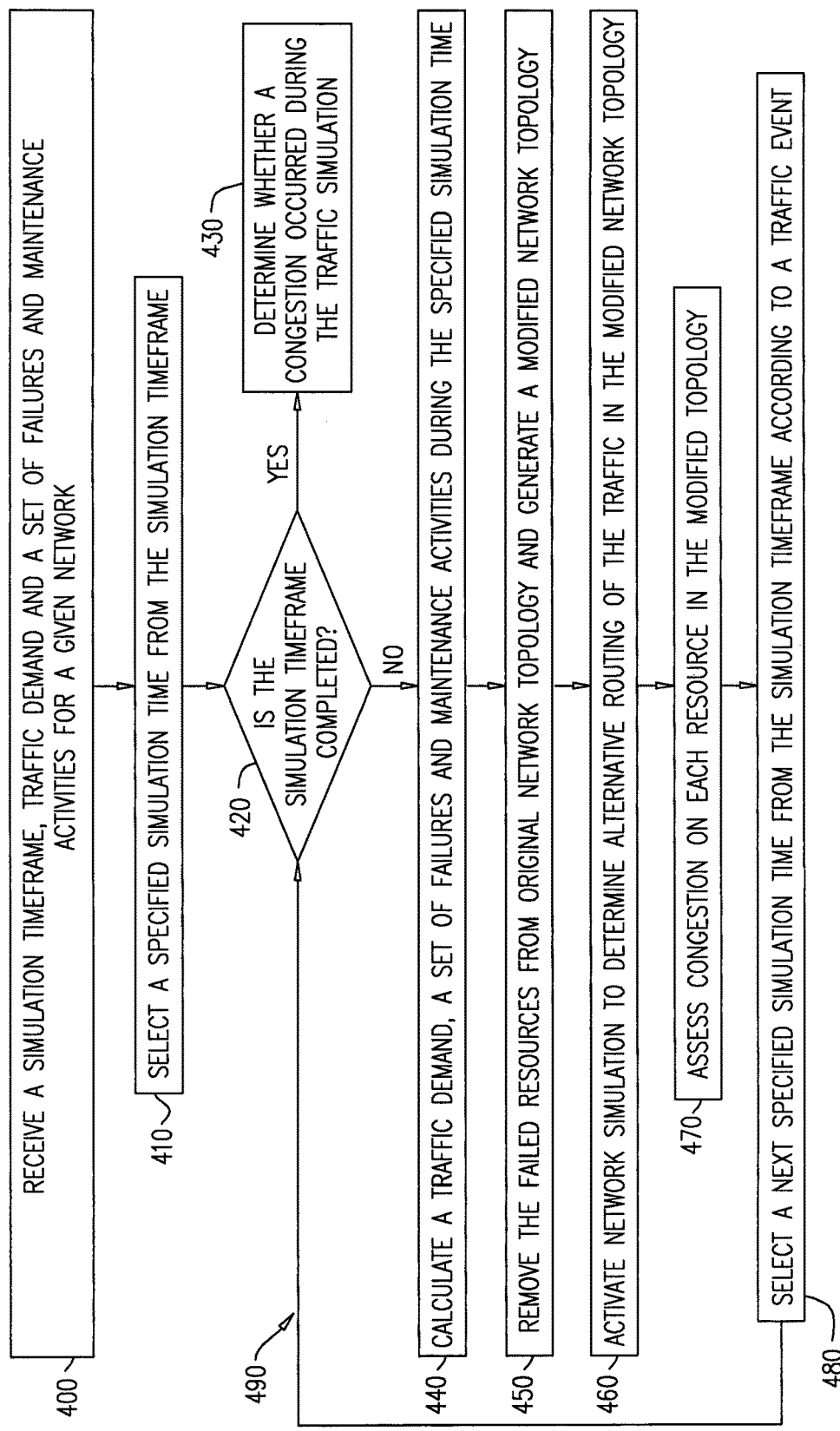

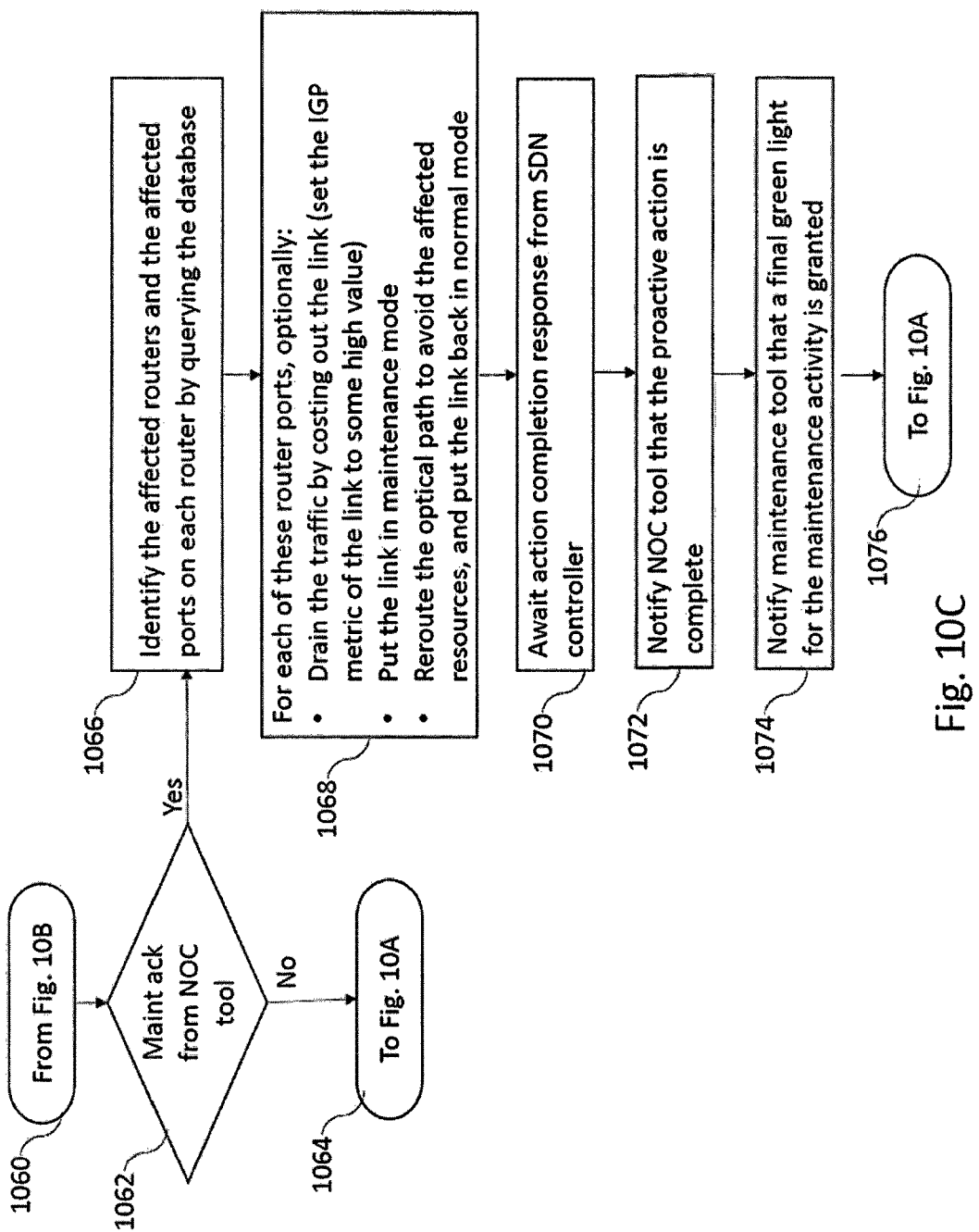

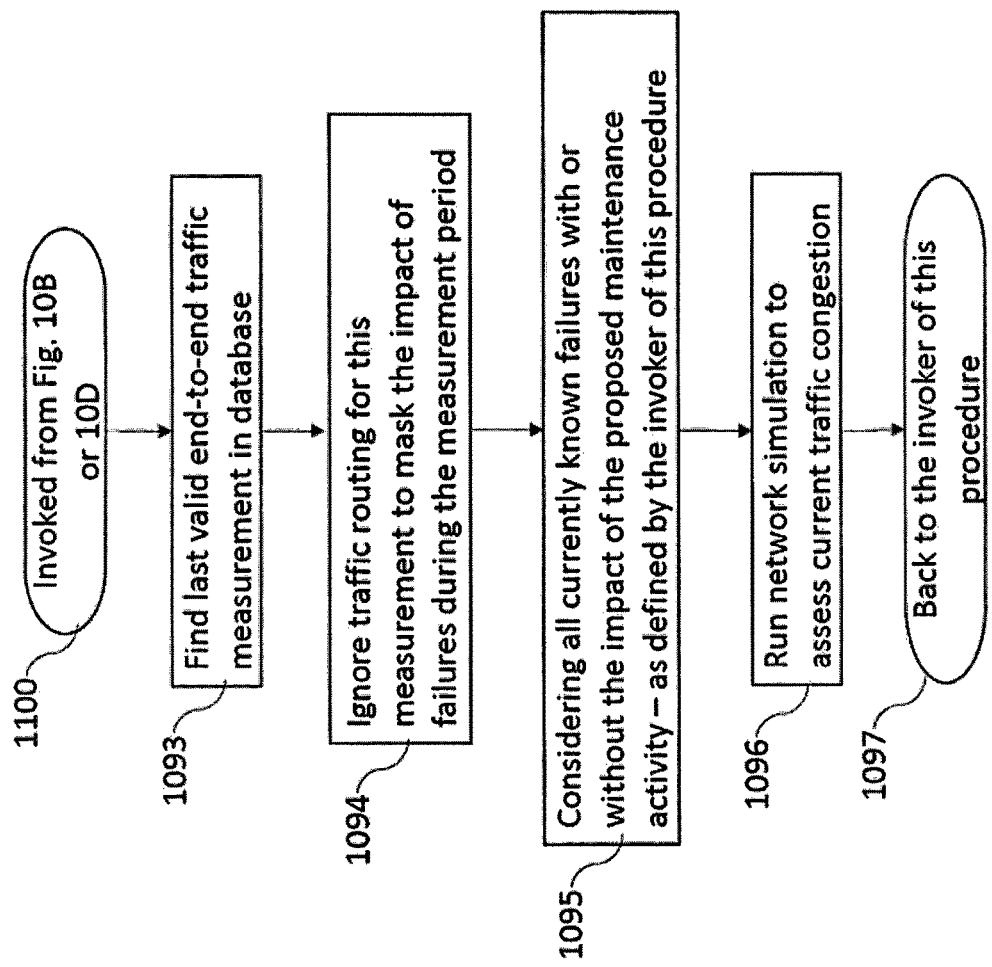

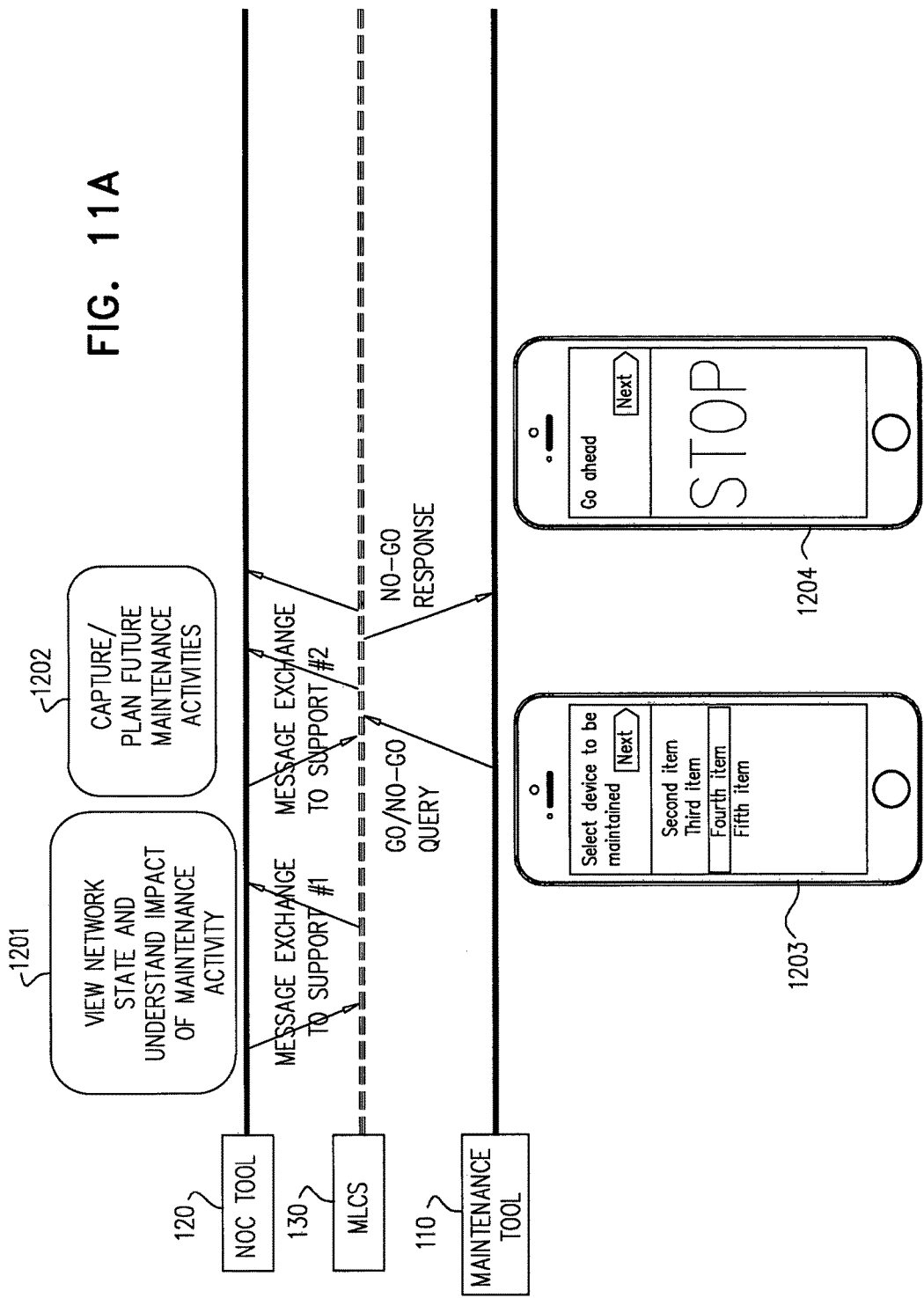

SYSTEMS AND METHODS FOR MANAGING MULTI-LAYER COMMUNICATION NETWORKS

FIELD OF THE INVENTION

The subject matter relates generally to systems for managing multi-layer communication networks. Embodiments of the present invention relate to a system for scheduling maintenance in multi-layer communication networks and minimizing impact of maintenance activities on traffic through the multi-layer communication network.

BACKGROUND

Decades ago, the rise in demand for telephony services spurred on the deployment of high capacity optical fiber networks. The subsequent rise in demand for Internet services resulted in leveraging of such optical networks for transmission of IP packets in an IP-over-Optical communication scheme. Such a multi-layer configuration utilizes the IP routers for controlling networking functions and the optical network for providing high throughput communication paths between the IP routers.

The communication path disruption can result from scheduled or unscheduled maintenance activities or from fiber failures, e.g. physical failure due to fiber severing or equipment failures, and can result in a communication traffic slowdown or a partial e.g. time limited, or complete interruption of communication traffic through a portion of the network.

SUMMARY OF THE INVENTION

One exemplary embodiment of the disclosed subject matter is a computerized system for performing preparation operations for a maintenance activity that causes a disruption in a communication path of traffic over a multi-layer network, wherein the multi-layer network may comprise an Internet Protocol (IP) layer and an optical layer, wherein the packet switching layer may comprise one or more IP links and one or more IP nodes, wherein the optical layer may comprise one or more optical links and one or more optical nodes. The system may comprise:
a maintenance tool configured to coordinate maintenance activities of the multi-layer network based on maintenance activity data, wherein the maintenance activity data may comprise at least a network traffic state, a network topology and a maintenance activity state;
a storage unit to store the maintenance activity data; and
a multi-layer control system which may comprise a processor, wherein said processor may be configured to:
 a. receive from the maintenance tool an indication that one or more maintenance activities are required on an indicated optical resource, wherein the indicated optical resource may comprise at least an optical link or an optical node or a part of a node;
 b. determine an affected optical path, said affected optical path utilizing bandwidth resources associated with optical links and nodes, wherein said affected optical path utilizes the indicated optical resource;
 c. determine an affected IP link utilizing said affected optical path;
 d. remove traffic from the affected IP link by rerouting traffic through one or more-alternative IP links;
 e. remove the affected optical path by releasing the bandwidth resources utilized by the affected optical path;
 f. activate an alternative optical path, wherein the alternative optical path circumvents the indicated optical resource;
 g. configure the packet switching layer to utilize the alternative optical path, by associating bandwidth resources in optical nodes and links of the alternative optical path to corresponding IP nodes and links of the packet switching layer, in order to reroute traffic transferred via the affected IP link to pass through the alternative optical path;
 h. repeat operations (b)-(g) for each affected optical path and each affected IP link; and
 i. provide an indication to a maintenance person via the maintenance tool that the maintenance activity is permitted.

Another exemplary embodiment of the disclosed subject matter is a computerized system for restoring a network state after performing a maintenance activity that causes a disruption in a communication path of traffic over a multi-layer network, wherein the multi-layer network may comprise an Internet Protocol (IP) layer and an optical layer, wherein the packet switching layer may comprise one or more IP links and one or more IP nodes, wherein the optical layer may comprise one or more optical links and one or more optical nodes, the system may comprise:
a maintenance tool configured to coordinate maintenance activities of the multi-layer network based on maintenance activity data, wherein the maintenance activity data may comprise at least a network traffic state, a network topology and a maintenance activity state;
a storage unit to store the maintenance activity data; and
a multi-layer control system comprising a processor, wherein said processor may be configured to:
 j. receive an indication from the maintenance tool that the maintenance activity for an indicated optical resource is completed;
 k. determine whether one or more IP links utilizes an alternative optical path;
 l. select an IP link that utilizes an alternative optical path;
 m. instruct the packet switching layer to remove traffic from the selected IP link;
 n. instruct the optical layer to reroute traffic passing via the alternative optical path to a previous optical path stored in the storage unit, wherein the previous optical path includes the indicated optical resource;
 o. instruct the packet switching layer to reroute traffic back to the selected IP link; and
 p. repeat operations (b)-(f) until no IP link utilizes an alternative optical path.

The maintenance tool may comprise a maintenance tool display unit to display the maintenance activity data.

The processor may be further configured to indicate that the alternative optical path has been determined and the maintenance activity should proceed. The processor may be further configured to calculate an updated network traffic measurement by combining current traffic data and historical traffic data, wherein the current traffic data may comprise data related to current maintenance activities and the historical traffic data comprises data related to previous maintenance activities. The processor may be further configured to identify at least one suitable timeframe to schedule the maintenance activity, therein a suitable timeframe may be calculated according to current traffic data and the historical traffic data.

A computerized system for performing preparation operations for a maintenance activity that causes a disruption in a communication path of traffic over a multi-layer network, wherein the multi-layer network comprises a pocket switching layer and an optical layer, wherein the packet switching layer comprises one or more IP links and one or more IP nodes, wherein the optical layer comprises one or more optical links and one or more optical nodes, the system may be comprising:

a maintenance tool configured to coordinate maintenance activities of the multi-layer layer network based on maintenance activity data, wherein the maintenance activity data comprises at least a network traffic state, a network topology and a maintenance activity state;
 a storage unit to store the maintenance activity data; and
 a multi-layer control system comprising a processor, wherein said processor may be configured to:
  a. receive an indication of an affected optical path said affected optical path utilizing bandwidth resources associated with optical links and nodes, wherein said affected optical path utilizes an optical resource requiring maintenance;
  b. receive an indication of an affected IP link utilizing said affected optical path;
  c. receive an indication of an alternative optical path, wherein the alternative optical path circumvents the selected optical resource;
  d. receive an indication that the packet switching layer is configured to utilize the alternative optical path; and
  e. update properties associated with the affected IP link in order to reflect characteristics of the alternative optical path, said properties including at least one of the following: latency, distance, affinity value and shared risk link groups (SRLG).

Another exemplary embodiment of the disclosed subject matter is a computerized method for performing preparation operations for a maintenance activity that causes a disruption in a communication path of traffic over a multi-layer network, wherein the multi-layer network comprises an Internet Protocol (IP) layer and an optical layer, wherein the packet switching layer comprises one or more IP links and one or more IP nodes, wherein the optical layer comprises one or more optical links and one or more optical nodes, the method may comprise:

coordinating, by a maintenance tool, maintenance activities of the multi-layer network based on maintenance activity data, wherein the maintenance activity data may comprise at least a network traffic state, a network topology and a maintenance activity state;
 storing, by a storage unit, the maintenance activity data; and
 performing, by a processor of a multi-layer control system, the operations:
  a. receiving, from the maintenance tool, an indication that one or more maintenance activities are required on an indicated optical resource, wherein the indicated optical resource comprises at least an optical link or an optical node or a part of a node;
  b. determining an affected optical path, said affected optical path utilizing bandwidth resources associated with optical links and nodes, wherein said affected optical path utilizes the indicated optical resource;
  c. determining an affected IP link utilizing said affected optical path;
  d. removing traffic from the affected IP link by rerouting traffic through one or more alternative IP links;
  e. removing the affected optical path by releasing the bandwidth resources utilized by the affected optical path;
  f. activating an alternative optical path, wherein the alternative optical path circumvents the indicated optical resource;
  g. configuring the packet switching layer to utilize the alternative optical path, by associating bandwidth resources in optical nodes and links of the alternative optical path to corresponding IP nodes and links of the packet switching layer, in order to reroute traffic transferred via the affected IP link to pass through the alternative optical path;
  h. repeating operations (b)-(g) for each affected optical path and each affected IP link; and
  i. providing an indication to a maintenance person via the maintenance tool that the maintenance activity is permitted.

Another exemplary embodiment of the disclosed subject matter is a computerized method for restoring a network state after performing a maintenance activity that causes a disruption in a communication path of traffic over a multi-layer network, wherein the multi-layer network comprises an Internet Protocol (IP) layer and an optical layer, wherein the packet switching layer comprises one or more IP links and one or more IP nodes, wherein the optical layer comprises one or more optical links and one or more optical nodes, the method may comprise:

coordinating by a maintenance tool maintenance activities of the multi-layer network based on maintenance activity data, wherein the maintenance activity data may comprise at least a network traffic state, a network topology and a maintenance activity state;
 storing, by a storage unit, the maintenance activity data; and
 performing, by a processor of a multi-layer control system, the operations:
  a. receiving an indication from the maintenance tool that the maintenance activity for an indicated optical resource is completed;
  b. determining whether one or more IP links utilizes an alternative optical path;
  c. selecting an IP link that utilizes an alternative optical path;
  d. instructing the packet switching layer to remove traffic from the selected IP link;
  e. instructing the optical layer to reroute traffic passing via the alternative optical path to a previous optical path stored in the storage unit, wherein the previous optical path includes the indicated optical resource;
  f. instructing the packet switching layer to reroute traffic back to the selected IP link; and
  g. repeating operations (b)-(f) until no IP link utilizes an alternative optical path.

The method, may further comprise displaying, by a maintenance tool display unit, at least a portion of maintenance activity data. The method may further comprise indicating, by the processor, that the alternative optical path has been determined and the maintenance activity should proceed. The method may further comprise calculating by the processor an updated network traffic measurement by combining current traffic data and historical traffic data, wherein the current traffic data may comprise data related to current maintenance activities and the historical traffic data comprises data related to previous maintenance activities.

The method may be further comprising identifying, by the processor, at least one suitable timeframe to schedule the maintenance activity, wherein a suitable timeframe may be calculated according to current traffic data and the historical traffic data.

The method may be further comprising updating, by the processor, properties associated with the affected IP link in order to reflect characteristics of the alternative optical path, said properties including at least one of the following: latency, distance and shared risk link groups (SRLG).

Another exemplary embodiment of the disclosed subject matter is a computerized system for performing preparation operations for a maintenance activity that causes a disruption in a communication path of traffic over a multi-layer network, wherein the multi-layer network comprises an Internet Protocol (IP) layer and an optical layer, wherein the packet switching layer comprises one or more IP links and one or more IP nodes, wherein the optical layer comprises one or more optical links and one or more optical nodes, the system may comprise:
- a maintenance tool configured to coordinate maintenance activities of a multi-layer network based on maintenance activity data, wherein the maintenance activity data comprises a network traffic state, a network topology and a maintenance activity state;
- a storage unit to store the maintenance activity data; and
- a multi-layer control system comprising a processor, wherein said processor is configured to activate a traffic simulation engine for a simulation timeframe, wherein the traffic simulation engine is configured to:
  a. receive an indication that one or more maintenance activities simulations are required on an indicated optical resource, wherein the indicated optical resource comprises at least one optical link or optical node or a part of a node, wherein the maintenance activity simulations include a simulation timeframe;
  b. determine an affected optical path, said affected optical path utilizing bandwidth resources along optical links and nodes, wherein said affected optical path utilizes the indicated optical resource;
  c. determine an affected IP link utilizing said optical path;
  d. simulate removal of traffic from the affected IP link to assess a traffic congestion value for the affected IP link;
  e. repeat operations (b)-(d) for each affected IP link until the simulation timeframe is ended; and
  f. generate an indication of the traffic congestion value that was calculated for the simulation timeframe.

The traffic congestion is a reduced quality of service that occurs when a network resource is carrying more data than it can handle.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, and may not be repeatedly labeled and/or described.

Figure 3:
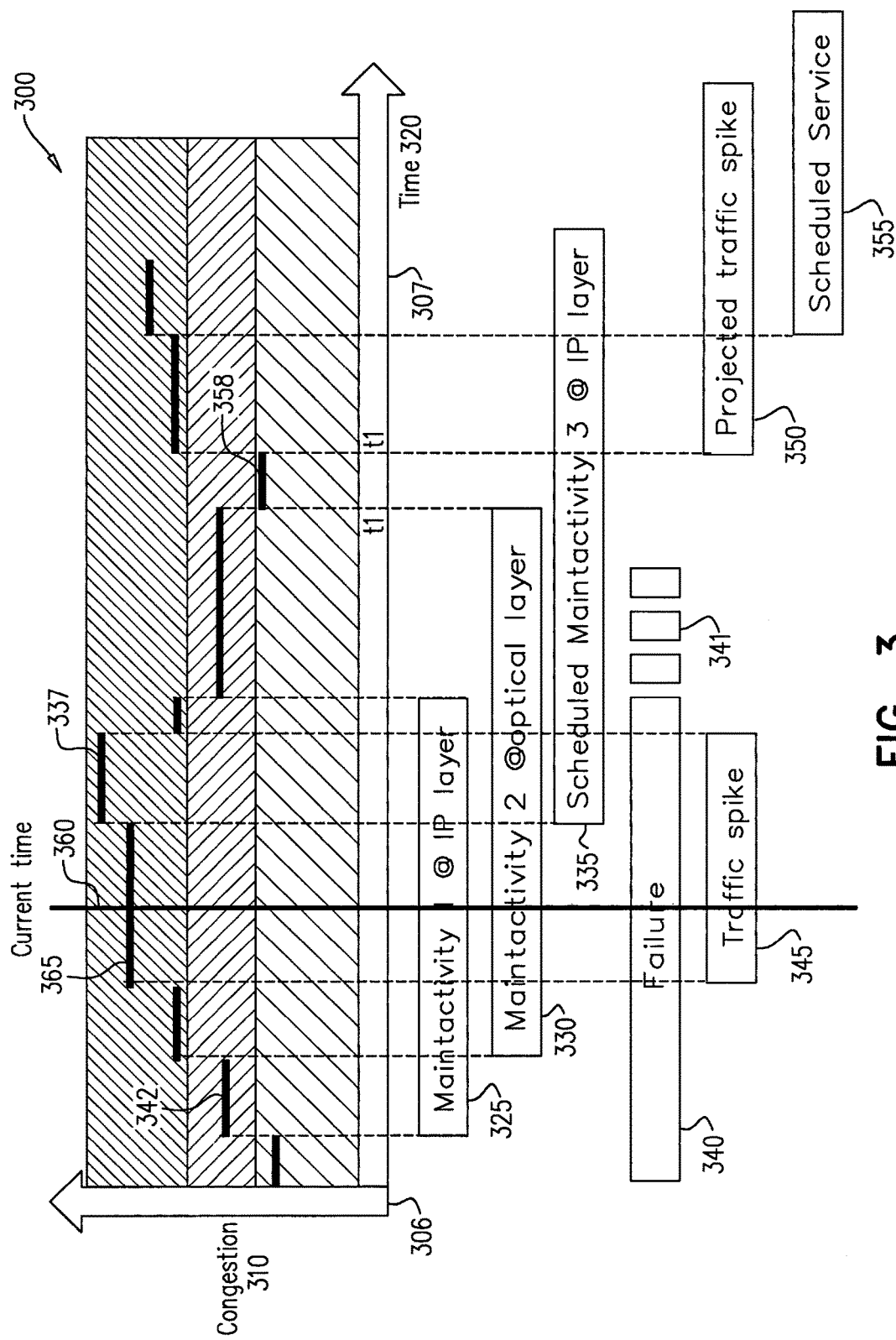

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

References to previously presented elements are implied without necessarily further citing the drawing or description in which they appear.

Figure 6B:
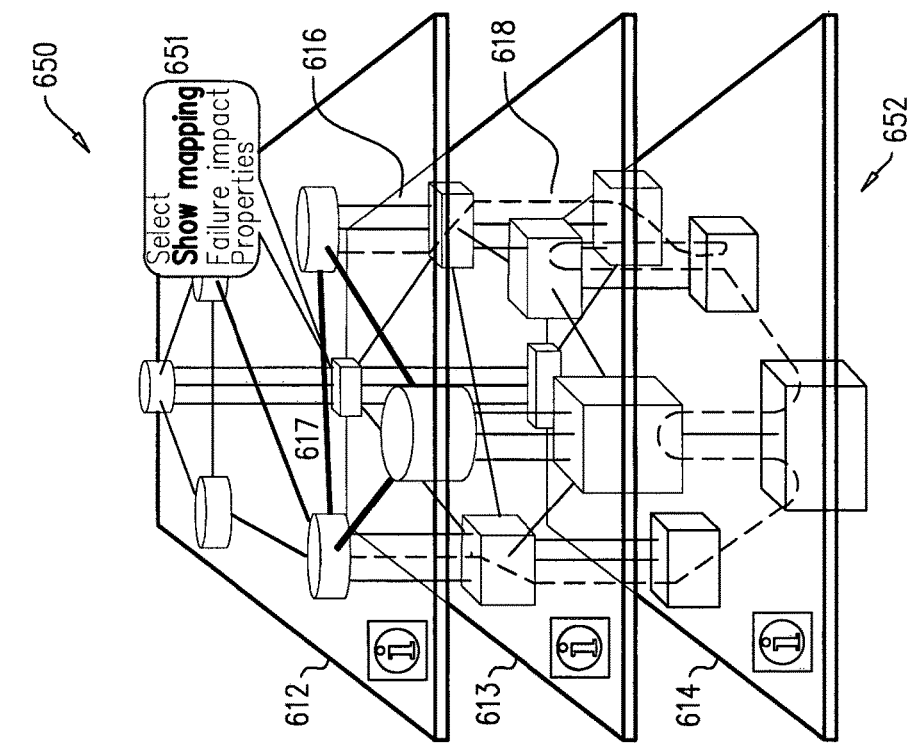
Figure 6A:
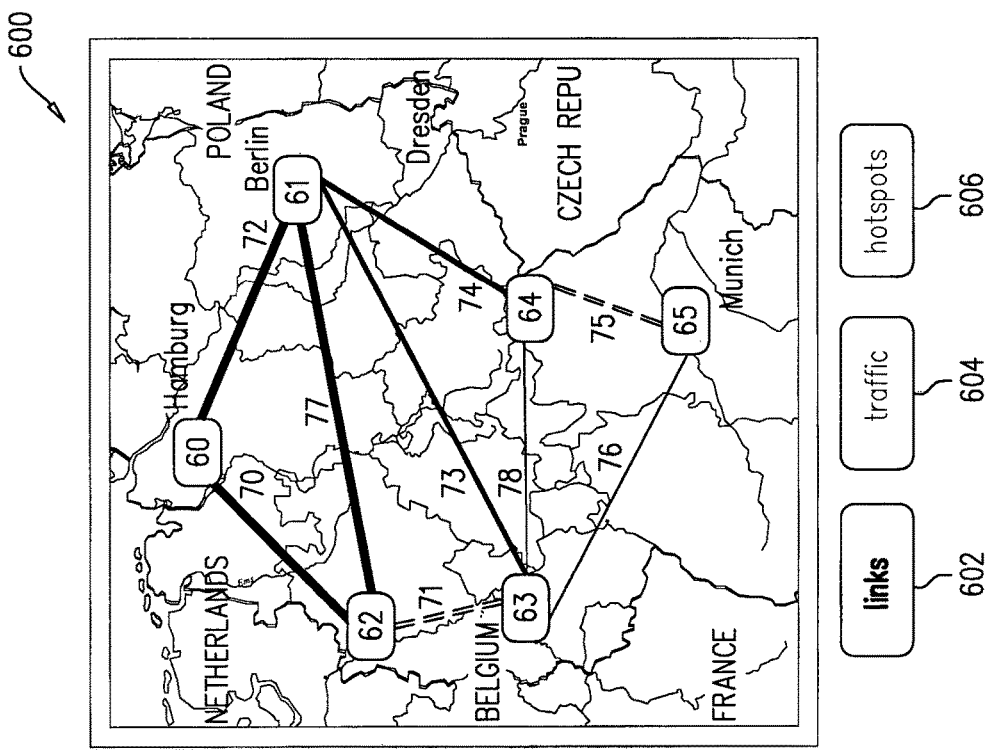
Figure 7B:
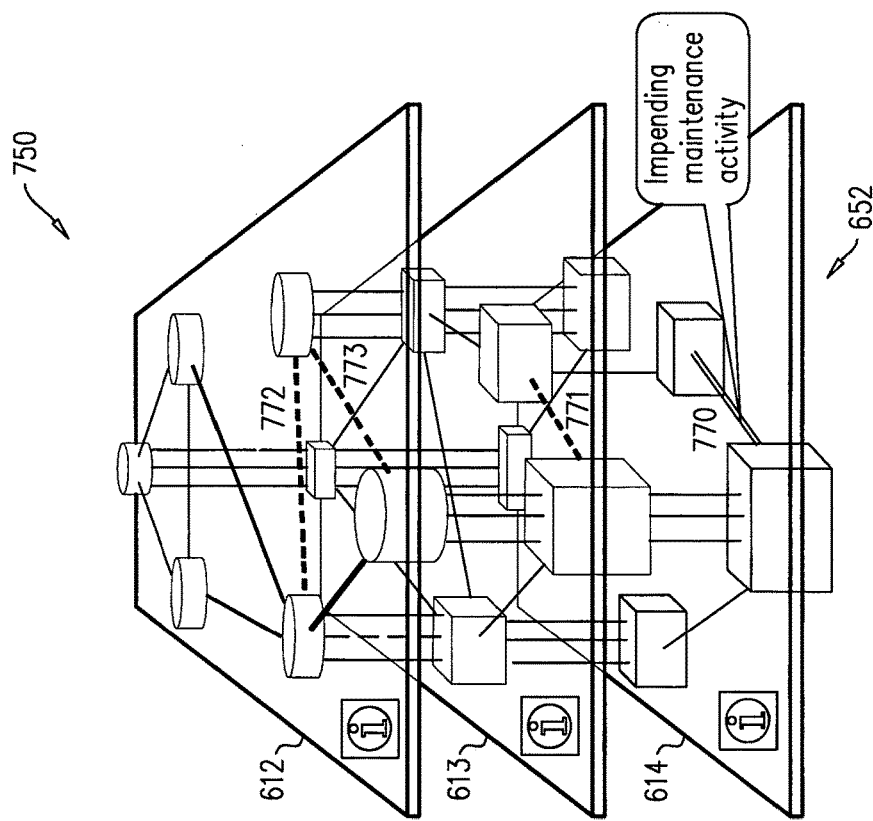
Figure 7A:
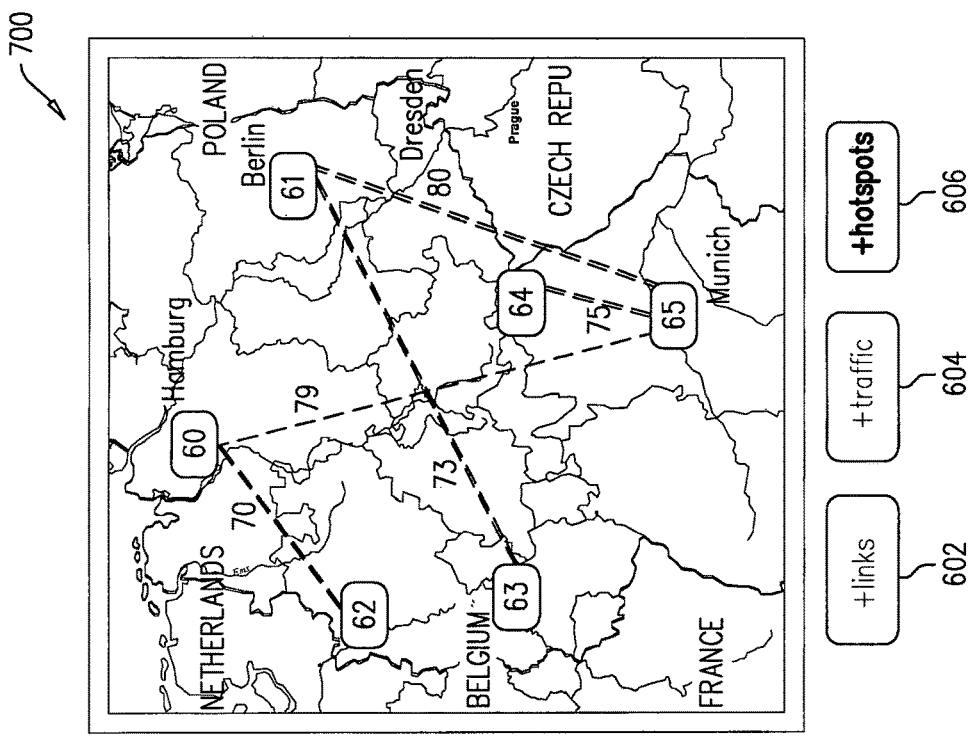
Figure 8B:
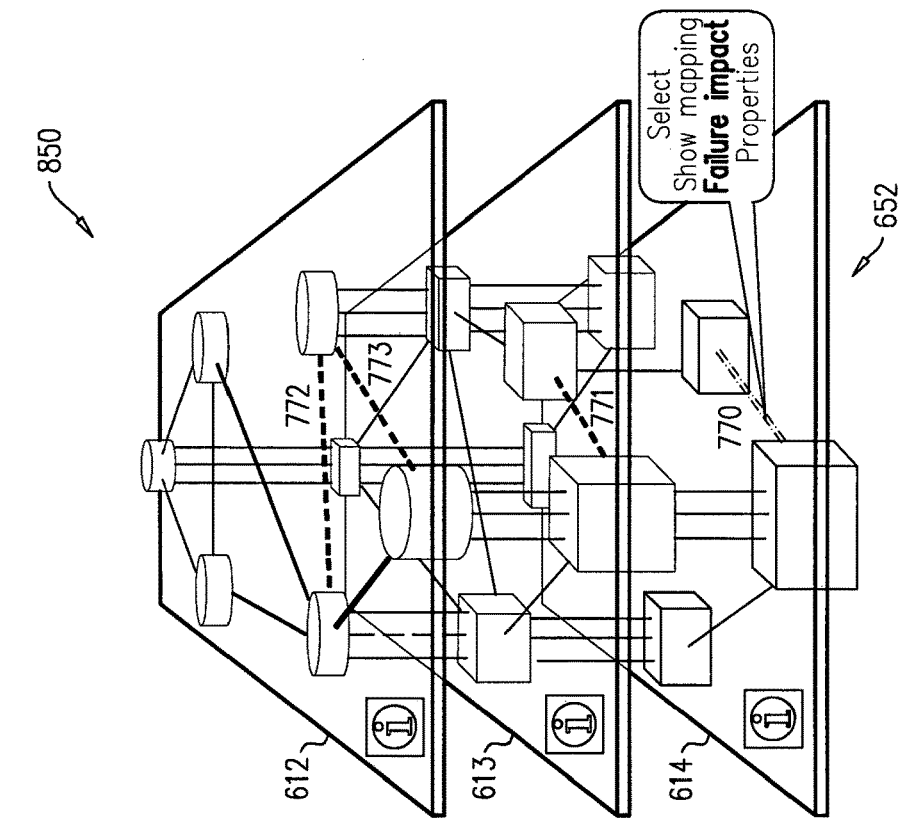
Figure 8A:
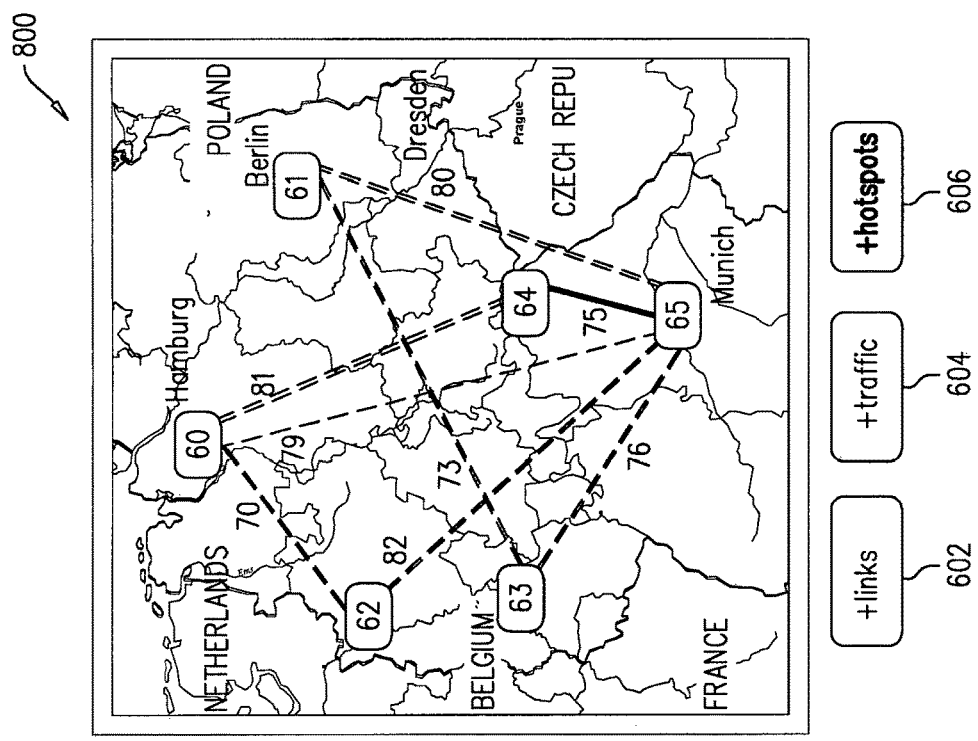
Figures 9A, 9B:
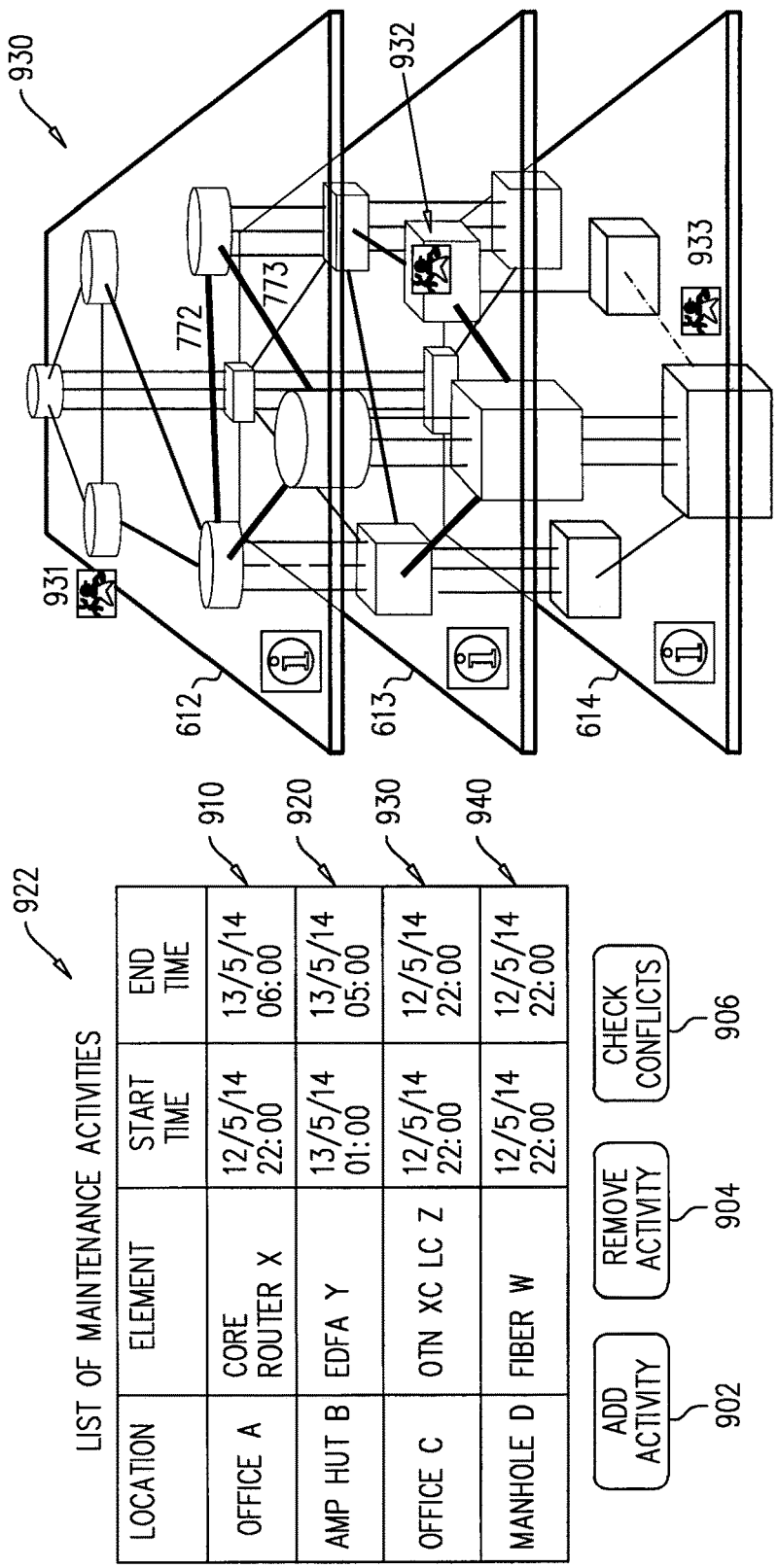

FIG. 1A is a schematic illustration of a system for centralized control of data traffic in a multi-layer network environment, according to embodiments of the disclosed subject matter;

FIG. 1B is a schematic illustration of another embodiment of a system for centralized control of data traffic in a multi-layer network environment which includes multiple single-layer controllers, according to the disclosed subject matter;

FIG. 2A is a flowchart of a method for performing operations on a multi-layer network in preparation for a maintenance activity of an optical resource, according to embodiments of the disclosed subject matter;

FIG. 2B is a flowchart of a method for restoring a network configuration state after a maintenance activity has been completed according to embodiments of the present subject matter;

FIG. 3 illustrates a user interface example for displaying a network congestion level and traffic state, along with maintenance activity planning and failure indication display over time, according to embodiments of the disclosed subject matter;

FIG. 4 is a flowchart of a method for estimating impact of maintenance activities on a multi-layer network, according to embodiments of the disclosed subject matter;

FIG. 5A-E are diagrams providing a visual representation of a network state during preparation of the network for a maintenance activity, according to embodiments of the disclosed subject matter;

FIGS. 6A, 7A and 8A illustrate exemplary displays of a NOC tool user interface, according to embodiments of the disclosed subject matter;

FIGS. 6B, 7B and 8B illustrate graphical representations of a multi-layer network mapping, according to embodiments of the disclosed subject matter;

FIGS. 9A and 9B schematically illustrate a table of scheduled maintenance activities and a corresponding network state display.

FIG. 10A-E schematically illustrate operations of a method for mapping a multi-layer network and preparing for maintenance activities of a network resource in a multi-layer network, according to embodiments of the disclosed subject matter.

Figure 11B:
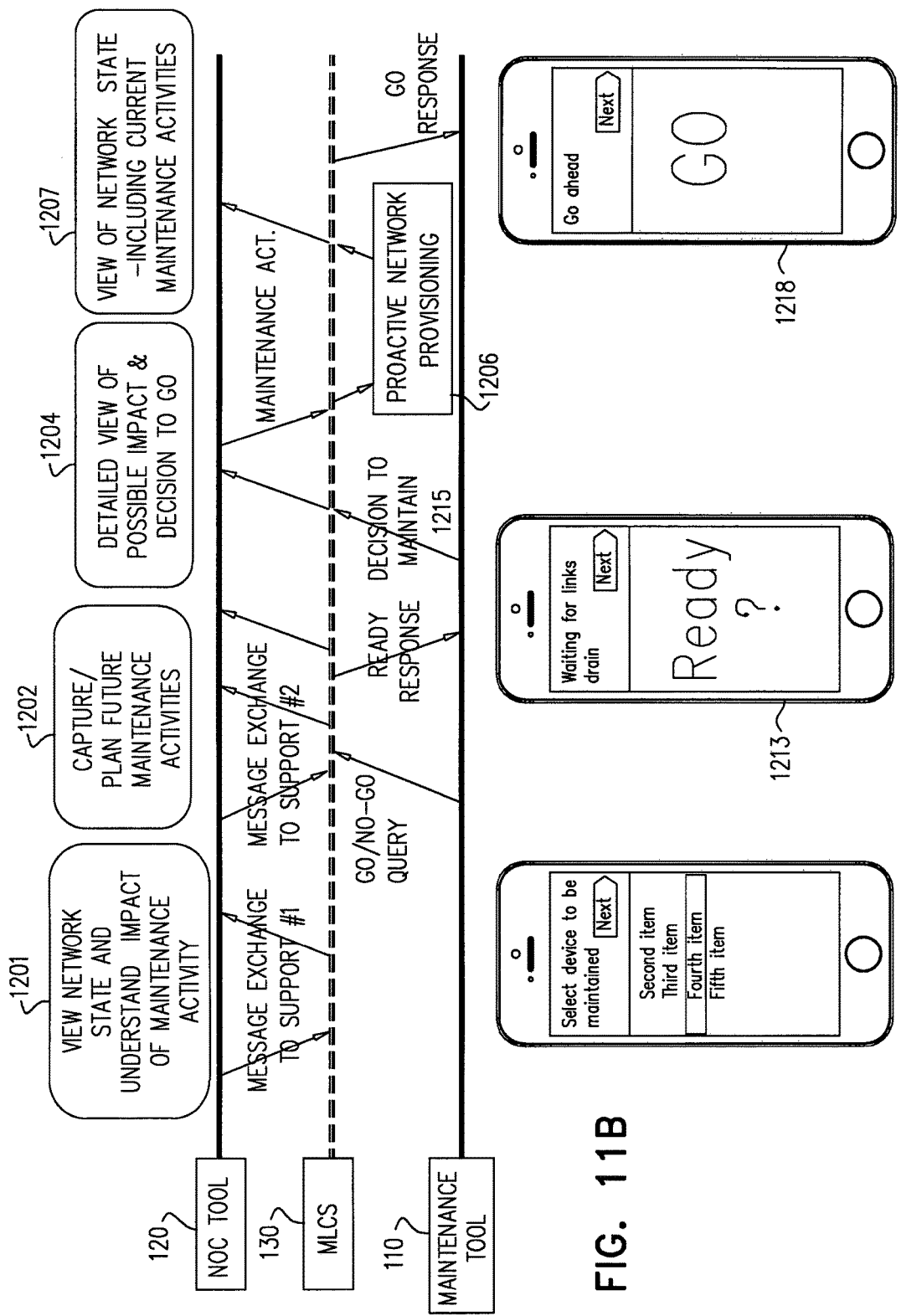
Figure 11C:
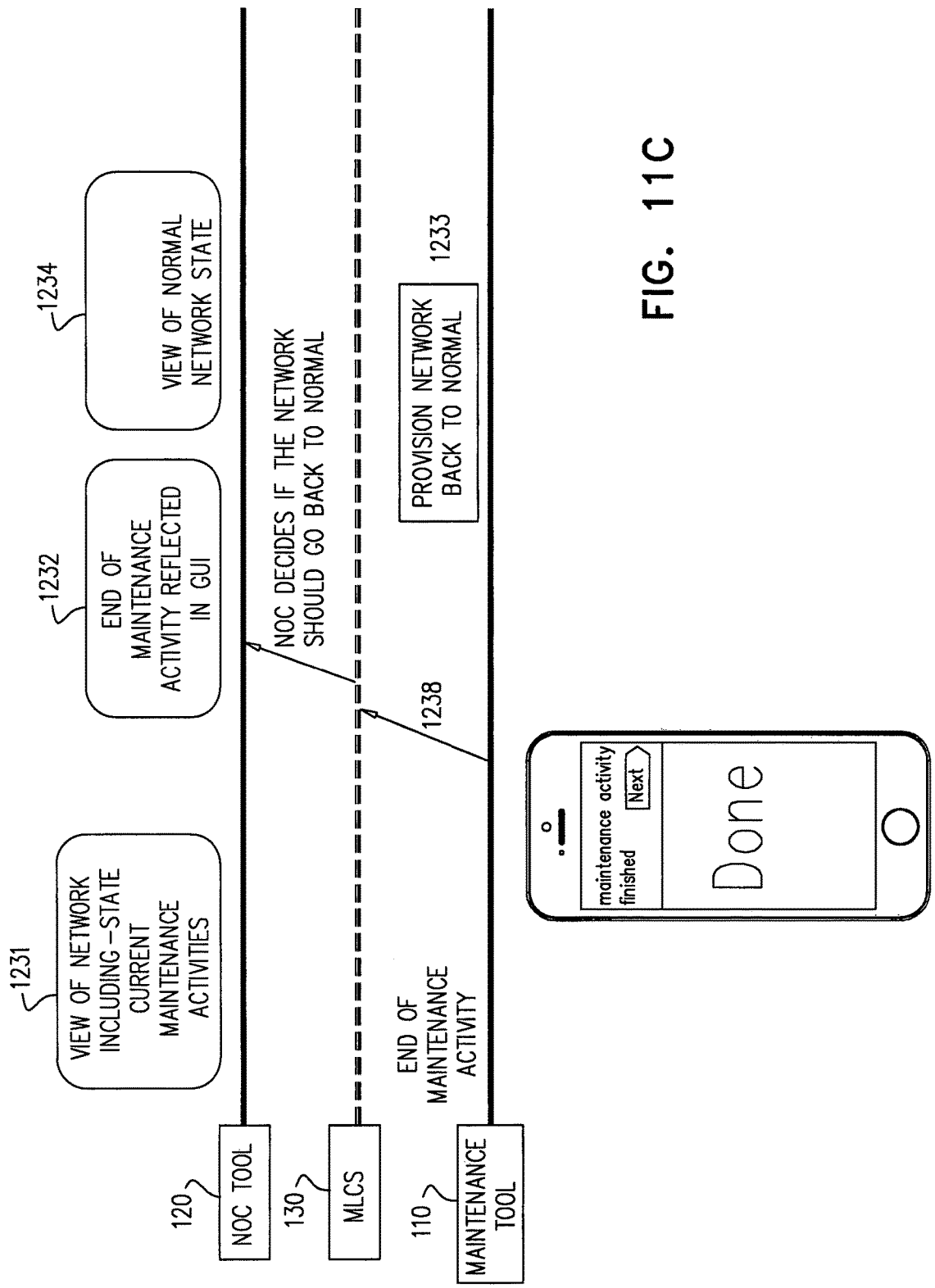

FIG. 11A-C are schematic illustrations of notifications and display screens of a method for performing a network maintenance activity (respectively) prior to maintenance activity, during maintenance activity and after maintenance activity, according to embodiments of the disclosed subject matter.

DETAILED DESCRIPTION

Communication networks carry extremely large amounts of communication traffic, and are widely spread across multiple geographical locations, any service interruption or congestion at the IP or optical layers brought on by scheduled or unscheduled maintenance activities can impact a large amount of users.

One technical problem dealt by the disclosed subject matter relates to the fact that maintenance activities in large multi-layer networks greatly contribute to reducing network performance. When such activities are planned and are carried out at designated maintenance time windows, they can still negatively impact network performance due to unforeseen traffic conditions. When such activities are unplanned—a frequent occurrence in many networks—they can substantially degrade network performance resulting in service contract violations, penalties, and loss of customers.

Another technical problem dealt by the disclosed subject matter is directed to the fact that maintenance activities are typically manually coordinated through the NOC tool 120. A network operator schedules a maintenance activity based on network conditions and demands and dispatches the maintenance person to the location to perform maintenance. Although, maintenance activities are scheduled such that they minimally impact network performance, since multi-layer networks are typically managed layer by layer with little coordination between the layers, it is virtually impossible to ascertain how a maintenance activity in one layer would impact performance of the other layer.

One technical solution according to the disclosed subject matter includes a system for managing and controlling resources in a multi-layer network. The system may be used to ascertain the impact of a communication path disruption on communication traffic through the multi-layer network, and reroute traffic around the disruption so as to reduce the impact of the disruption on the network. The system minimizes the impact of scheduled and unscheduled maintenance activities on the performance network and enables scheduling of maintenance activities while taking into account the impact of such activities on multiple layers of the multi-layer network.

A potential technical effect of the disclosed subject matter is a system which can be used to manage a multi-layer communication network, e.g., schedule maintenance activities in IP-over-Optical networks and minimize the impact of scheduled and unscheduled maintenance activities on network performance.

Present day multi-layer communication networks include a client layer (e.g. packet switching layer) overlaid on top of a preexisting server layer (e.g. optical layer). Since such networks were not designed from the ground up as an integrated solution, management of multi-layer networks requires separate control over each network layer oftentimes without taking into consideration the effects of maintenance of one layer on communication through another layer.

In some embodiments different layers may be controlled by different operators, e.g. different operators within the same company organization or different operators belonging to different companies organizations, thus making the network management task and scheduling even more difficult.

The lack of tools for integrating management of both server and client layers forces operators to maintain each layer separately and as such, scheduling of maintenance activities is performed using incomplete information regarding the state of the multi-layer network.

A general non-limiting presentation of practicing the present disclosure is given below, outlining exemplary practice of embodiments of the present disclosure and providing a constructive basis for variant and/or alternative embodiments, some of which are subsequently described.

Thus, according to one aspect of the present invention there is provided a system for predicting the impact of a communication path disruption on a multi-layer network FIG. 1A and FIG. 1B are schematic illustrations of two embodiments of a system for centralized control of data traffic in a multi-layer network environment, according to the disclosed subject matter.

Reference is made to FIG. 1A. The multi-layer communication network managing system 100 may be or may include a controller 140, e.g. a computer or a server, and may include or may be operationally connected to a MLCS 130, which includes a processor 132 and further includes or is operationally connected to one or more storage units 135A and/or 135B, a NOC tool 120 and a maintenance tool 110. The processor 132 may be further configured to perform one or more of the following operations:

a. receive from the maintenance tool an indication that one or more maintenance activities are required on an indicated optical resource, wherein the indicated optical resource comprises at least an optical link or an optical node or apart of a node;
  b. determine an affected optical path, said affected optical path utilizing bandwidth resources associated with optical links and nodes, wherein said affected optical path utilizes the indicated optical resource;
  c. determine an affected IP link utilizing said affected optical path;
  d. remove traffic from the affected IP link by rerouting traffic through one or more alternative IP links;
  e. remove the affected optical path by releasing the bandwidth resources utilized by the affected optical path;
  f. activate an alternative optical path, wherein the alternative optical path circumvents the indicated optical resource;
  g. configure the packet switching layer to utilize the alternative optical path, by associating bandwidth resources in optical nodes and links of the alternative optical path to corresponding IP nodes and links of the packet switching layer, in order to reroute traffic transferred via the affected IP link to pass through the alternative optical path;
  h. repeat operations (b)-(g) for each affected optical path and each affected IP link; and
  i. provide an indication to a maintenance person via the maintenance tool that the maintenance activity is permitted.

The processor 132 may be further configured to perform one or more of the following operations:

a. receive an indication from the maintenance tool that the maintenance activity for an indicated optical resource is completed;
  b. determine whether one or more IP links utilizes an alternative optical path;
  c. select an IP link that utilizes an alternative optical path;
  d. instruct the packet switching layer to remove traffic from the selected IP link;
  e. instruct the optical layer to reroute traffic passing via the alternative optical path to a previous optical path stored in the storage unit, wherein the previous optical path includes the indicated optical resource;
  f. instruct the packet switching layer to reroute traffic back to the selected IP link; and
  g. repeat operations (b)-(f) until no IP link utilizes an alternative optical path.

The processor 132 may be further configured to indicate that the alternative optical path has been determined and the maintenance activity should proceed.

A distance value associated with the alternative optical path may be calculated by MLCS 130, for example, by computing a sum of distances of the optical links along that path. The distance value for each optical link may be provided by the optical controller, e.g. controller 140, and may be based on a direct measurement of an optical gear or a manual entry of the distance by a network operator. Alternatively, the distance may be assessed by MLCS 130 based on a geographic distance between sites.

The processor 132 may be further configured to calculate an updated network traffic measurement by combining current traffic data and historical traffic data, wherein the current traffic data comprises data related to current maintenance activities and the historical traffic data comprises data related to previous maintenance activities.

The processor 132 may be further configured to identify at least one suitable timeframe to schedule the maintenance activity, wherein a suitable timeframe is calculated according to current traffic data and the historical traffic data. A suitable timeframe may be determined, for example, when the estimated congestion level of the network is lower than a predetermined threshold.

The processor 132 may be further configured to update properties associated with the affected IP link in order to reflect characteristics of the alternative optical path, said properties including at least one of the following: latency, distance and shared risk link groups (SRLG). The latency value may be calculated based on a user configurable parameter multiplied by the distance value. The SRLGs for an alternative path is the collection (group) of all SRLG values provisioned on the optical links and nodes along the optical path. The SRLG values may be also provided by the optical controller, e.g. controller 140. Alternatively, the MLCS 130 may generate a single unique SRLG per each optical link, and associate them as a group for each optical path.

The processor 132 may be further configured to activate a traffic simulation engine for a simulation timeframe, wherein the traffic simulation engine is configured to perform one or more of the following operations:
  a. receive an indication that one or more maintenance activities simulations are required on an indicated optical resource, wherein the indicated optical resource comprises at least one optical link or optical node or a part of a node, wherein the maintenance activity simulations include a simulation timeframe;
  b. determine an affected optical path, said affected optical path utilizing bandwidth resources along optical links and nodes, wherein said affected optical path utilizes the indicated optical resource;
  c. determine an affected IP link utilizing said optical path;
  d. simulate removal of traffic from the affected IP link to assess a traffic congestion value for the affected IP link, wherein the traffic congestion is a reduced quality of service that occurs when a network resource is carrying more data than it can handle;
  e. repeat operations (b)-(d) for each affected IP link until the simulation timeframe is ended; and
  f. generate an indication of the traffic congestion value that was calculated for the simulation timeframe.

In the context of the present disclosure the expression 'optical layer' relates to a set of Optical Network Elements (ONE) connected by optical fiber links, able to provide functionality of transport, multiplexing, switching, management, supervision and survivability of optical channels carrying client signals. In the context of the present disclosure the expression 'server layer' relates to an optical layer of a multi-layer network.

In the context of the present disclosure the term 'affinity value' relates to an arbitrary value utilized by the packet switching layer for routing decisions. One or more affinities may be provisioned for each optical link by a network operator. The affinity value list for an optical path may be the collection of affinity values for all optical links along that path.

In the context of the present disclosure the expression 'Packet Switching Layer relates to a group of internetworking methods, protocols, and specifications that may be used to transport data from an originating computer across network boundaries to a destination computer specified by a network address which is defined for this purpose by the IP.

In the context of the present disclosure the expression 'client layer' relates to a communication transfer which requires service functions from a server layer, e.g. a packet switching layer, an IP layer, which may be overlaid on top of a preexisting server layer.

In the context of the present disclosure, without limiting, the term 'traffic' relates to communication traffic flow, traffic flow, packet flow or network flow and is a sequence of packets from a source computer to a destination computer, which may be a host, a multicast group, or a broadcast domain.

In the context of the present disclosure, without limiting, the term 'disruption' of network traffic relates to change of impact on the traffic through the network which may be caused, e.g., by scheduled or unscheduled maintenance, service activity, and/or network resource failures.

In the context of the present disclosure the expression 'optical path' may relate to optical resources which are connected by nodes and which may be utilized by an IP link to transfer traffic through the network.

In the context of the present disclosure the expression 'software-defined networking (SDN) controller', e.g. controller 155 of FIG. 1A, relates to an application in a SDN environment that manages traffic flow to enable intelligent networking SDN controllers 155 may be based on protocols, such as OpenFlow, that allow servers to tell switches where to send packets. The SDN controller is the core of an SDN network. It lies between network devices at one end and applications at the other end. Any communications between applications and devices pass through the SDN controller. The SDN controller also uses protocols such as OpenFlow to configure network devices and choose the optimal network path for application traffic. In effect, the SDN controller serves as a sort of operating system (OS) for the network. A maintenance application may be collocated with the SDN controller on a server, or may be part of the maintenance tool 110 and the NOC tool 120. The maintenance application may reside on a remote device that communicates with the SDN controller using a protocol, e.g. a REpresentational State Transfer application programming interface (RESTful API).

In the context of the present disclosure, without limiting, the term 'controller 140' relates to the $3^{rd}$ party ml controller 140A, or to the orchestration platform 140B. The controller 140 may be a unit that activates various activities through the network, e.g. a maintenance activity. In one embodiment the controller 140 stores the pertinent information in a database, including time-based storage for traffic statistics, and responds to queries and notification from various tools, e.g. a maintenance person request as well as from the network, e.g., link failures.

In the context of the present disclosure, without limiting, the expression 'storage unit 135' may relate to a storage unit 135A which is included in tire controller 140 and/or to a storage unit 135B included in the MLCS 130.

In the context of the present disclosure, without limiting, the expression 'Bandwidth Calendaring (BWC)' relates to exploits knowledge about future traffic, in order to optimally schedule and route the network traffic. Bandwidth calendaring may embody the concept of time-based bandwidth manipulation. In these cases, the manipulation refers to the addition, deletion, or modification of bandwidth in the network in order to match traffic patterns, service demands and disruptions, or operational planning for future changes such as capacity.

In the context of the present disclosure, without limiting, the term 'port' relates to an endpoint of communication in the network which completes the destination or origin address of a communication session. A port is identified for each address and protocol by a 16-bit number, commonly known as the port number.

In the context of the present disclosure the expression 'communication path' relates to a path, e.g. an IP path and/or and optical path or a combined path, that transfers communication either from one layer's port to another layer's port, or between different ports within a single layer. For example, there may be communication paths between a server layer port and a client layer port or communication paths of the optical layer, e.g. communication paths between optical layer ports.

In the contest of the present disclosure, without limiting, a 'node' or a 'network node' relate to a connection point, a redistribution point, or a communication endpoint (e.g. data terminal equipment) which is attached to a network, and is capable of creating, receiving, or transmitting information over a communications channel. The node may either be a data communication equipment (DCE) such as a modem, hub, bridge or switch; or a data terminal equipment (DTE) such as a digital telephone handset, a printer or a host computer, for example a router, a workstation or a server. The type of a node depends on the type of network and layer referred to. For example, an IP node refers to a connection node included in an IP network layer, an optical node refers to a connection node included in an optical network layer etc.

In the context of the present disclosure, without limiting, the term 'link' relates to a physical and/or logical network component used to interconnect nodes (e.g. hosts or computers) in the network, for example, an optical link or an IP link. A network host is a computer or other computerized device connected to a computer network which may include information resources, services, and applications for users or other nodes in the network. An optical link may be an optical fiber communications link that consists of an optical circuit which provides a data connection between two endpoints. An Internet Protocol (IP) link may be a logical network by which data is transferred, e.g. from one server to another.

In the context of the present disclosure, without limiting, the expression 'network element 170' may relate to elements which are part of the network, e.g., a node.

In the context of the present disclosure, without limiting, the expression 'network resource' or 'resource' relates to a resource of the server layer or optical layer in a multi-layer network, which may include one or more optical nodes and/or optical links and/or a part of a node, such as an electronic board, that implements a certain function in a node.

In the context of the present disclosure, without limiting, the expression 'bandwidth resource' relates to at least one wavelength which may be utilized by an optical resource in an optical path. An optical link may comprise a plurality of bandwidth resources, which may be utilizing various wavelengths.

In the context of the present disclosure, without limiting, the expression 'network layer' relates to a layer that provides the functional and procedural means of transferring variable-length data sequences from a source to a destination computer via one or more networks, while maintaining the quality of service functions. The network layer knows the address of the neighboring nodes in the network, packages output with the correct network address information, selects routes and quality of service, and recognizes and forwards to the transport layer incoming messages for local host domains. Among existing protocol that generally map to the Open Systems Interconnection (OSI) network layer are the Internet Protocol (IP) part of TCP/IP and NetWare IPX/SPX.

In the context of the present disclosure, without limiting, the expression 'multi-layer communication network' relates to a communication network which includes at least two network layers, e.g. a transport layer such as an optical layer which may be based on Dense Wavelength Division Multiplexing (DWDM) technology, and an Internet Protocol (IP) layer. Multi-layer networks may also include one or more additional network layers, e.g. a middle layer of Time division Multiplexing (TDM) switches, such as defined by Optical transport Networking (OTN), or alternatively, a packet-optical or Ethernet layer instead of a packet switching layer.

In the context of the present disclosure, without limiting, the expression 'multi-layer control system' (MLCS) relates to a computing platform which may be activated using at least one server. The MLCS, e.g. MLCS 130 of FIG. 1A, may be connected to a high speed multi-layer communication network via a dedicated low speed network in order to collect information from the multi-layer network relating to inter-layer and intra-layer connectivity and traffic conditions.

The MLCS 130 includes, or is operationally connected to, a maintenance application which collects and stores information from the multi-layer network. The information is stored in a storage unit, e.g. storage unit 135. The information collected and stored by the MLCS 130 may be obtained via various network layer protocols, e.g. interior gateway protocol (IGP) or border gateway protocol (BGP)-LS for topology and Netflow or Simple Network Management Protocol (SNMP) counters for traffic measurements, management systems, e.g., Alcatel's SAM or centralized controllers for each of the layers, e.g. Cisco's WAE or Juniper's Northstar, or planning tools and related tools, e.g., Cisco's MATE design or MATE collector tools.

The MLCS 130 may be configured in several ways. For example, the MLCS 130 may connect, e.g. locally or remotely, to a multi-layer software defined network controller 140 e.g. controller 140A of FIG. 1A or orchestration platform 140B of FIG. 1B, which controls all layers, and a multi-layer maintenance application that provides the specific logic and data required for support to the maintenance tool 110 and the NOC tool 120.

The MLCS 130 may be connected to vendors-specific SDN controllers 155, which may control a single layer or a single vendor portion of the network. These SDN controllers 155 may be connected to a multi-layer orchestration platform e.g. orchestration platform 140B which ties the layers together. The MLCS 130, which may be connected to the NOC tool 120 and maintenance tool 110, may be operationally connected to the orchestration platform 140B.

In the context of the present disclosure, a 'Network Operations Center (NOC) tool' relates to an application which may be installed or executed on a computerized system, e.g. PC or tablet, and may be used by a technician for coordinating maintenance activities of the multi-layer network. The NOC tool 120 may provide the following functions: (i) maintenance activity scheduler; (ii) Network graphical user interlace (GUI) implementing various components; and (iii) simulation analysis capabilities.

For compact and lucid exposition of the present disclosure, a 'maintenance tool' may refer to an application on a, e.g. PC or tablet and may be used by a maintenance person performing maintenance activity. The maintenance tool 110 may provide one or more of the following functions: (i) calendar display of ongoing and planned maintenance activities; (ii) indication whether to perform an activity; and (iii) indication to a technician or maintenance person at the NOC tool 120 which maintenance activity is activated.

In some embodiments, operations of the maintenance tool may be activated by or included in the NOC tool 120 and thus the maintenance tool 110 may be unnecessary. For example, the calendar display of ongoing and planned maintenance activities may be included in functions that are activated by the NOC tool 120.

A multi-layer communication networks managing system further includes a NOC tool 120 and/or a maintenance tool 110 for operating and/or controlling and/or receiving indications or notifications from the MLCS 130 via local or remote terminals such as personal computers, tablets or smartphones.

As is mentioned hereinabove, the MLCS 130 may map layer connections and may detect and log traffic data over time. Collection of such traffic data can be achieved using, e.g. Netflow or Jflow technologies, implemented into tools such as the MATE Collector or the WAE controller which are available from Cisco Systems, Inc.

As used herein, the expression 'multi-layer orchestration platform' relates to a system that receives traffic data from SDN controllers (e.g. SDN controllers 155 of FIG. 1A) which may be supplied by multiple vendors), and consolidates information from multiple controllers into a common multi-layer network model. The multi-layer orchestration platform may interface with the SDN controllers 155 to execute required operations and activities. The activities may conform to various characteristics such as carrier-grade capabilities to enable scalability, robustness, policy control, and transaction support, e.g. using established open source tools.

In the context of the present disclosure, without limiting, the expression 'network congestion' or a 'traffic congestion' or a 'high traffic congestion level' relates to reduced quality of service that occurs when a network resource is carrying more data than it can handle. Typical effects include queueing delay, packet loss or the blocking of new connections. A consequence of the latter two effects is that an incremental increase in offered load leads either only to a small increase or even a decrease in network throughput. According to embodiments of the present invention, a traffic congestion value may be associated with an IP link in order to assess whether a maintenance activity may be scheduled.

In the context of the present disclosure, without limiting, the expression 'traffic simulation engine' relates to a computerized device e.g. a server or a computer or a processing unit, which includes executable software instructions, e.g. a computer program that models the behavior of a network either by calculating the interaction between various network resources using mathematical formulas, or actually capturing and playing hack observations from a production network.

In the context of the present disclosure the expression 'a link costing out' or 'costing out' relates to setting an Interior Gateway Protocol (IGP) metric for a link to a predetermined high value in order to cause the packet switching layer to stop using the IP link, and may be used to reroute communication paths.

The multi-layer communication networks managing system 100 may perform one or more of the following operations:

map interconnectivity between optical layer nodes and packet switching layer nodes to define communication paths between specific server layer and client layer ports;

map communication paths of the optical layer, e.g. communication paths between optical layer ports; collecting time-related data on communication traffic through the multi-layer network (e.g., under normal network operation conditions and during maintenance activities);

obtain the topology and related configuration data from both IP and optical layers including updates if the topology changes;

obtain notifications regarding failures in IP and optical layers;

perform scheduling of maintenance activity;

assist in decisions regarding maintenance by simulating their impact on the network; warn the operator if a future scheduled maintenance activity has a larger than expected impact due to current network conditions; and/or perform automatic initiation of service-affecting activities at the most opportune time (e.g. least impact on network).

In one embodiment the MLCS 130 and/or the controller 140 may be connected to multiple single-layer SDN controllers 155 or multi-layer SDN controller 140A in order to transfer instructions and receive traffic or topology data from one or more network elements 170.

In another embodiment the MLCS 130 and/or the controller 140 may provide instructions directly to one or more network elements 170 and/or network resources.

Both the NOC tool 120 and the maintenance tool 110, may communicate with the MLCS 130 via one or more communication channels 129, e.g. a wireless or wired network, e.g. using technologies such as cellular, Wi-Fi, Bluetooth, Local Area Network or Wide Area Network, Virtual Private Network (VPN), Secure Shell (SSH).

The storage unit 135 may store maintenance activity data relating to the multi-layer network, including, for example, network state (e.g. a network traffic state, and/or a network configuration state or network topology) and/or a maintenance activity state.

The maintenance activity data, that may be stored in the storage unit 135, may further include a maintenance activity database which stores data relating to previously performed maintenance activities, current or ongoing maintenance activities, and planned maintenance activities for various layers of the network. This information may be input, e.g., manually by human operators via the NOC tool 120, or may be received from the maintenance tool 110, or from an external database of maintenance activities, or from another tool that is operationally connected to the MLCS 130.

The maintenance activity state, that may be stored in the storage unit 135, may indicate whether a maintenance activity is currently initiated, completed, postponed, etc. The data relating to rite maintenance activity state may be used for scheduling other maintenance activities. For example, if one maintenance activity was postponed, other maintenance activities which may be related to this postponed activity may require rescheduling.

The network traffic state indicates the current traffic through the network, obtained for example from MLCS 130 and/or the controller 140. The network traffic state may include, for example, data relating to the links and/or nodes which currently have a high traffic throughput, the links and/or nodes which are congested, etc. Therefore, the network traffic state may indicate whether the current traffic transported through the network enables performing a maintenance activity according to the maintenance activity data collected regarding the current traffic through the network. The network traffic state may be stored by the storage unit 135, and may be combined into traffic statistics.

The network configuration state or network topology, that may be stored in the storage unit 135, includes one or more network topologies (e.g. nodes and links utilized by the optical layer and by the packet switching layer) that is associated with a network state before, during or after a maintenance activity. The network configuration state may be stored in the storage unit 135 and may be used for optimal scheduling of required maintenance activities. Additionally, upon completion of a maintenance activity, the previous optical path may be restored based on the network configuration state data stored in the storage unit 135. If an indication is provided, e.g. by MLCS 130, that the removal of the alternative optical path is permitted or allowed, (if no IP links are utilizing the alternative optical path), the previous optical path or the previous network configuration state may be restored based on topology parameters stored before initialing the maintenance activity.

The storage unit 135 may store, for example, one or more of the following types of data: (i) network topology of each layer, e.g. nodes and the links interconnecting the layers; (ii) maps of interconnections between ports of the packet switching layer and respective ports of the optical layer; (iii) traffic statistics across each layer; and (iv) failure alarms, maintenance notifications or indications and other notifications regarding the network state, e.g., network topology configuration, network traffic state, etc.

The NOC tool 120 may be or may include computerized system or processing unit that may provide information relating to the structure (e.g. links and nodes) of a multi-layer or network based on a network map stored by the MLCS 130, as well as current failures and current maintenance activities performed in the network.

The NOC tool 120 may also support a network simulation analysis, in which the user requests to simulate a failure maintenance of a link or node and the NOC tool 120 displays via the NOC tool display unit 125 whether other layer links, e.g. higher layer links, may be impacted and how the congestion level in the network will be affected. In a typical use-case the selected link may be an optical fiber, and the impact may be shown for packet switching layer traffic. This simulation analysis may provide an indication, e.g., to the NOC tool 120, whether to execute a planned or unplanned maintenance activity.

The maintenance tool 110 receives a maintenance indication from the NOC tool 120 whether the maintenance activity may proceed. The indication may be displayed by the maintenance tool display unit 115, e.g. by providing a visual or audible indication or a message, or by illuminating differing LED indicators (e.g. a green indicator or a red indicator, respectively), to proceed or to stop the maintenance activity, etc.

The maintenance indication may be based on a RESTful API through which a traffic simulation engine is queried regarding the impact of the failure. The resulting simulated state of links and end-to-end traffic can be requested via a similar API and displayed via the NOC tool display unit 125. The end-to-end traffic may be calculated from an entry point of said network, e.g., the network owned by the service provider, or a domain within said network, to an exit point of said network.

In one embodiment the traffic parameters or patterns to be used for a simulation activated by the MLCS 130 of the maintenance impact may be selected by a user. For example, a simulation may be based on the current traffic pattern, the average traffic over the last predetermined number of hours, e.g. 8-24, the peak traffic during the last pre determined number of hours, the estimated traffic level during a specified time period in the future based on historical data and/or current data, etc.

The NOC tool 120 may also be used to support management of current and future maintenance activities. For example, a user may input planned maintenance activities and scheduled services (e.g., bandwidth calendaring) and, based on the simulation analysis, assess whether the combination of these activities may cause traffic congestion, e.g., due to a combination of maintenance activities and anticipated traffic conditions. Once these activities are recorded and stored in the storage unit 135, the NOC tool 120 may list all maintenance activities, e.g. planned or unplanned, during a user-requested time window or according to a timeline.

In another embodiment, when an impending planned or unplanned maintenance activity may overlap with other near-term planned activities, or cause traffic congestion given the current or expected traffic, based on both scheduled services which are stored in the planned maintenance activity database and projected traffic based on the simulation analysis (which may include historical traffic measurements, as well as current failure conditions), the NOC tool 120 may warn the user by providing a notification regarding the expected network congestion.

The network congestion alert or warning regarding the expected network congestion may be displaced via the NOC tool display unit 125 and/or the maintenance tool display unit 115. The warning may be sent by the MLCS 130 to the NOC tool 120 and may be displayed visually and/or audibly.

The planned maintenance alert provided by the MLCS 130 of planned maintenance activities may also affect the activation of the maintenance tool display unit 115, e.g. green/red lighting, for example, the red light may be extended to imply that there is an overlap between the impending activity and a planned activity which may result in congestion or traffic loss.

The planned maintenance activity database stores impending or planned maintenance activities and may be updated based on a user's input via the NOC tool 120 for future planned activities, or based on indication from the maintenance tool 110 that a maintenance person requests to maintain an element in the network. In order to determine whether a congestion may be expected, the tool may include the traffic simulation engine, e.g. implemented as a traffic simulation algorithm, e.g. as disclosed with relation to FIG. 4 herein, based on simulation of the network traffic over time.

The above process requires an updated traffic measurement and the traffic routing through the network. The updated traffic measurement may be calculated by combining current traffic data and a traffic historical data. The current traffic data may include, in addition to throughput and congestion data, data related to current maintenance activities and the traffic historical data may include data related to previous maintenance activities.

The updated traffic measurement may be difficult to obtain in a timely manner, thus the traffic data of a network may be not accurate, e.g. may be updated only once in a predetermined time period such as every 30 minutes.

Since maintenance activities may occur immediately after failures or at the same time as other maintenance activities, it is important to get a more up-to-date assessment of the network topology and network traffic state. The NOC tool 120 may calculate the updated traffic measurement, for example, by combining the traffic demands from the last measurement, and ignoring how the traffic was routed at the measurement time. The NOC tool 120 may use the latest alarms (e.g. stored in the maintenance activity database) from the network to calculate the updated traffic measurement. The NOC tool 120 may use the traffic simulation engine to assess the route given the current set of failed or maintained resources.

The MLCS 130 may be configured in various manners. For example, in one embodiment the MLCS 130 may connect, locally or remotely, to controller 140 which may control all layers, and a multi-layer maintenance application that provides the specific logic and data and may support the maintenance tool 110 and the NOC tool 120.

FIG. 1B illustrates another embodiment of a centralized control system of a multiple single-layer network environment.

The multi-layer communication network managing system 100 as described in FIG. 1B may include a NOC tool 120, a maintenance tool 110, a MLCS 130, the storage unit 135A and/or 135B and network elements 170 which may be similar to these corresponding components described with relation to FIG. 1A. MLCS 130 may include a processor 132 and may be connected to one or more vendors-specific SDN controllers 155 (L0, L1, L3) in a multiple single-layer network. These SDN controllers 155 may be connected to a multi-layer orchestration platform 140B which ties the layers together. The MLCS 130 and connected NOC tool 120 and maintenance tool lift reside above the multi-layer orchestration platform 140B and are connected thereto.

In another embodiment the multi-layer orchestration platform 140B may be connected directly to the network elements 170. In this configuration, vendors-specific SDN controllers 155 (L0, L1, L3) are not required.

FIG. 2A is a flow-chart of a method for performing operations on a multi-layer network in preparation for a maintenance activity of an optical resource, according to embodiments of the disclosed subject matter.

Operation 210 includes receiving an indication, e.g., from controller 140 or generated by MLCS 130, that an optical resource such as an optical node or link or a part of a node, that requires a maintenance activity. The received indication may include an identification value of the optical resource and one or more parameters relating to the maintenance activity, for example, a type of maintenance activity, an estimated time duration required for the maintenance activity, a geographical area in which the optical resource resides, etc. For example, a maintenance activity may include replacing a torn optical cable, or fixing a failed optical switch.

Operation 220 includes determining, e.g. by MLCS 130, an affected optical path which utilizes bandwidth resources associated with optical links and nodes. The affected optical path utilizes the indicated optical resource which requires a maintenance activity in the multi-layer network.

Optionally, a determination of whether to allow maintenance of the optical resource may be performed or received by MLCS 130, e.g. by applying the traffic simulation engine which may assess the impact of removing an indicated optical resource on the communication traffic. If the traffic simulation engine indicates that there are no affected optical paths utilizing the indicated optical resource, the indicated optical resource may be removed for performing the maintenance activity, since no communication traffic is affected by such removal. However, if one or more affected optical path utilize the indicated optical resource, an alternative optical path is determined in order to allow performing the maintenance activity without disrupting the traffic through the network.

The alternative optical path may be determined by a controller of the optical layer, e.g. controller 140, according to one or more associated constraints such as, for example, the number and/or quality of operations required to set an alternative optical path (some may require more operations than others), the length of an alternative optical path which may impact the IP links utilizing the alternative optical path, e.g. cause a delay in network traffic, or the exposure of the alternative optical path to failures and/or the exposure of other optical paths, which may cause a large outage, if one or more failures materialize during a performed maintenance activity. The associated constraints may be used to set an optimal alternative optical path.

Properties or parameters of the alternative optical path may be stored, e.g., in storage unit 135. The properties may include, for example, which IP links utilize the alternative optical path, a simulation score of the indicated optical resource, the number of elements included in the alternative optical path, the latency of the alternative optical path, shared risk link groups (SRLG) through the alternative optical path, affinity value, etc. The optical resource simulation score may indicate, for example, the traffic transferred through the optical resource during a period of time or the severity of the impact of the removal of the optical resource due to the maintenance activity. The calculations regarding the optical resource simulation score may be performed, for example, by the MLCS 130 and/or controller 140.

If it is determined the indicated optical resource is not utilized by an affected optical path, in operation 225 an indication is provided, that the removal of the indicated optical resource is allowed or may proceed. The indication may be displayed visually and/or audibly, for example by the MLCS 130 sending or displaying a message to a maintenance person, via of the maintenance tool display unit 115.

Operation 230 includes selecting, by the MLCS 130, one affected optical path when more than one affected optical paths are determined. The selection of an affected optical path may be random, from the list of all affected optical paths determined in operation 220. In another embodiment the selection and order of removal of affected optical path may be determined, for example, according to data associated with the affected optical path or according to another order, e.g. configurable by a user.

In operation 232 the MLCS 130, may determine whether an IP link is utilizing the affected optical path that was selected in operation 230. If no IP link utilizes the affected optical path, the method may include returning to operation 220. Otherwise operation 235 may be activated.

Operation 235 includes instructing, by the MLCS 130, the packet switching layer to remove traffic from the affected IP link that was selected. The MLCS 130 may directly instruct one or more nodes, controllers, or routers of the packet switching layer, or send the instruction to MLCS 130 that the traffic is to be removed (e.g. rerouted to one or more different IP links) from the affected IP link. Removing traffic from the affected IP link may include modifying, by the MLCS 130, a state of the IP port at either end of the link or at both ends, e.g. by indicating that the IP port is set to a maintenance mode or an inactive mode. In one embodiment, removing the traffic may include costing out, e.g. by setting an IGP metric for the IP link to a high value.

Optionally, an indication may be received by the MLCS 130, that no traffic is transferred through the affected IP link.

In operation 240, the MLCS 130 may provide an instruction (e.g., to the controller 140) to remove the affected optical path by releasing the bandwidth resources utilized by the affected optical path. Furthermore, MLCS 130 may instruct activation of the alternative optical path determined in operation 220, which circumvents the indicated optical resource.

In operation 245, the MLCS 130 may provide an instruction to the packet switching layer to utilize the alternative optical path, which circumvents the indicated optical resource, by associating bandwidth resources in optical nodes and links of the alternative optical path to corresponding IP nodes and links of the packet switching layer, in order to reroute traffic transferred via the affected IP link to pass through the alternative optical path.

Furthermore, parameters of the original optical path that was utilized by the indicated optical resource may be stored, e.g., in storage unit 135A and/or 135B. The original optical path may be used later, e.g. for restoration of the original optical path upon completion of the maintenance activity. Other network-configuration parameters may be stored, e.g., in storage unit 135A and/or 135B, for later use in restoring the network configuration state (e.g. the network topology) upon completion of the maintenance activity.

Optionally, in operation 250, properties associated with an affected IP link, such as latency or distance (sometimes reflected via a routing metric) shared risk link, groups (SRLG), may be updated and stored, e.g. by MLCS 130 and/or by controller 140, in order to reflect characteristics of the alternative optical path which the affected IP link utilizes and affect IP routing decisions. The updated properties may be provided to the packet switching layer routers and/or to the packet switching layer controllers.

Arrow 255 indicates that after performing operations 220-250, the method may include returning to operation 220 and repeating these operations if there are additional affected optical paths and/or affected IP links.

FIG. 2B is a flowchart of a method for restoring a network configuration to a previous state, after a maintenance activity has been completed, according to embodiments of the present subject matter.

In operation 260, an indication is received by MLCS 130, e.g. from controller 140 or from NOC tool 120 or from maintenance tool 110, that a maintenance activity for an indicated optical resource is completed. The indication may include identification data or maintenance data relating to the indicated optical resource, one or more alternative optical paths, identification data of the maintenance activity, a time duration of the maintenance activity, a geographic area of the maintenance activity, etc. Maintenance data may include the network traffic state, e.g., whether the current traffic may enable performing a maintenance activity, the network configuration state, e.g. network topology before, during or after a maintenance activity, and the maintenance activity state, e.g. whether the maintenance activity is initiated, completed, postponed, etc.

Operation 262 includes determining, e.g. by MLCS 130, whether one or more IP links utilize an alternative optical path that was configured as a result of the maintenance activity of the indicated optical resource. If no IP links utilize an alternative optical path, and it is determined that no traffic is transferred via the indicated optical resource, then operation 265 may include, e.g. by MLCS 130, indicating that a previous network configuration state may be restored. The MLCS 130 may further instruct, e.g. by rerouting traffic passing via the alternative optical path to a previous optical path stored in the storage unit 135. However, if one or more IP links utilize the alternative optical path, it is required to clear traffic through these IP links first in order to reroute traffic back to the selected IP link without disrupting the traffic through the network.

Operation 270 includes selecting, e.g. by MLCS 130, an IP link if one or more IP links utilize the alternative optical path. The selection may be, for example, random selection from a list of IP links that may be generated in operation 262, or may be based on traffic data related to the affected IP links, for example, the possible impact or effect on traffic that may be caused by configuration of a specific IP link via a specific optical resource.

In operation 275, MLCS 130 may instruct the packet switching layer to clear or remove traffic from the selected IP link (that was selected in operation 270), e.g., by instructing a controller of the packet switching layer (e.g. controller 140), or by provisioning the corresponding IP routers directly. Optionally, Optionally, in operation 280 an indication may be generated by the MLCS 130, that no traffic is transferred through the selected IP link. Upon receiving the indication, traffic passing via the alternative optical path may be rerouted to a previous optical path stored in a storage unit 135, since the selected IP link is not utilizing the alternative optical path. Thus, the previous optical path or the previous network configuration state (parameters of which were stored before initiating the maintenance activity) may be restored.

In some embodiments, the previous optical path may not necessarily be restored, and one or more IP links that were temporarily rerouted to an alternative optical path, may keep utilizing the alternative optical path. Yet, in another embodiment, one or more IP links which utilized the alternative optical path prior to initiating the maintenance activity, may be restored (e.g., after the maintenance activity is completed) to the original or previous optical path, for example, if the effect on traffic is beneficial by restoring an IP link to utilize the previous optical path.

In operation 285, MLCS 130 may instruct the optical layer to reroute traffic passing via the alternative optical path to a previous optical path, which includes the indicated optical resource and stored in the storage unit 135. The previous optical path may be restored based on network configuration state and parameters that were stored during the preparation of the network for the maintenance activity, according to the method described in FIG. 2A.

In operation 287, MLCS 130 may instruct the packet switching layer to reroute traffic back to the selected IP link which utilized the alternative optical path, e.g. by modifying a state of the IP port at either end of the IP link or at both ends (e.g., by indicating that the IP port is set to an active mode). In one embodiment, restoring the traffic may include setting an IGP metric for the IP link back to its original low value. In another embodiment, the link state is set from inactive or in-maintenance back to normal mode—either in the IP controller or on a router port.

Optionally, in operation 290 properties associated with the selected IP link may be updated. For example, a latency routing metric value, shared risk link groups (SRLG), and additional parameters may be sent or recalculated by controller 140 and/or MLCS 130, in order to restore the characteristics of the previous optical path which is utilized by the selected IP link. The MLCS 130 may configure IP link properties to enable optimal routing for various network traffic flows, for example, by calculating and recording a list of SRLGs based on the optical route of one or more affected IP links or by changing the latency recorded of one or more IP links so that latency-sensitive traffic may be routed through an IP link with reduced latency if available.

Arrow 295 indicates that operations 262-290 are repeated, while there are additional IP links that utilize an alternative optical path that was set as a result of the completed maintenance activity.

FIG. 3 illustrates a user interface example of a maintenance planning use ease, displayed for a defined time period.

Axis 310 in the diagram 300 indicates a level or severity of congestion (Y axis) and axis 320 indicates a time period (X axis) that is displayed and included in a user interface. The time period may include a start time 306 and an end time 307. The time period may be requested or defined by the user, or may be provided routinely, e.g. for maintenance activities that are scheduled once a day.

Each maintenance activity includes a start time and an end time. For example, maintenance activity 325 on a packet switching layer, a maintenance activity 330 on an optical layer and a scheduled maintenance activity 335 on an optical layer each include a start time and an estimated end time.

Resource failures may include a start time, but not necessarily an end time. For example, a resource failure 340 includes a start time, and broken line 341 indicates that the failure end time may be unknown at the time the maintenance planning screen is displayed.

During the defined time period the resource failure 340 may be identified. The congestion value 342 is indicated as increased due to the resource failure 340.

Both the maintenance activity 325 on the packet switching layer and the maintenance activity 330 on the optical layer cause the congestion level to increase, since the maintenance activity affects the traffic through the network. Therefore, the congestion level 365 may relate to a traffic spike 345 that may be caused by these maintenance activities. At a current rime 360 a current traffic status through the network is presented to the user.

A scheduled maintenance activity 335 of the packet switching layer causes an additional increase of the congestion value 337 as indicated in the diagram 300. Planned future maintenance activities and scheduled services (e.g., bandwidth calendaring) may be also indicated on the user interface, for example, a projected traffic spike 350 and a scheduled service 355.

The planned future maintenance activities and scheduled services may enable to assess whether the combination of these activities may cause traffic congestion, e.g., due to a combination of maintenance activities and anticipated traffic conditions, and estimated level of congestion. Once these activities, e.g. planned future maintenance activities and scheduled services are recorded, they may be considered by the MLCS 130 or by the user, e.g., in order to reschedule maintenance activities. A suitable timeframe for performing a maintenance activity may be determined by MLCS 130 according to the estimated congestion level of the network and based on the planned maintenance activities and the network state or based on a policy dictating time of day. For example, the timeframe between t1 and t2 may be identified as a suitable timeframe for performing an urgent maintenance task, since the traffic congestion level 358 at this time period is relatively low.

FIG. 4 is a flowchart of a method for estimating impact of maintenance activities on a multi-layer network, according to embodiments of the disclosed subject matter.

Operation 400 includes receiving, for a certain network, the following data; a simulation timeframe (e.g., a span of time during which a maintenance activity is required to be performed), network traffic demand and a set of failures and other scheduled or unscheduled maintenance activities associated with the provided network.

The received data is used to activate a traffic simulation engine to estimate the maintenance activities impact on the network. The result of the traffic simulation performed for the provided simulation timeframe may enable determining an optimal maintenance schedule for the maintenance activity. The simulation timeframe may include a start time and an end time, e.g. start time of 5 AM to an end time 10 AM.

Some maintenance activities may be performed automatically at a convenient time, e.g. when they minimally impact the traffic through the network. For example, the network can optimize the use of optical spectrum in an automated way ("spectrum defragment") without human intervention. In such cases, the network can be 'allowed' to pick the optimal time for the activity. This can be done by the MLCS 130 through a request provided by the NOC tool 120. The maintenance activity may be scheduled for a time in which traffic is low and the impact on services is minimal. The determination of such a time may be identified using the traffic simulation engine, which may be activated and/or included in, MLCS 130 and/or controller 140.

In addition, the packet switching layer and the optical layer may be controlled by one or more network operators, and therefore the convenient time for a maintenance activity schedule may include determining or combining suitable timeframes to the one or more network operators which the packet switching layer and the optical layer are controlled by.

Operation 410 relates to a selection of a specified simulation time from the simulation timeframe. The specified simulation time may be initialized at the beginning of the traffic simulation to the start time of the simulation timeframe. The specified simulation time may be a point of time or an interval of time that occurs during the simulation time frame, e.g. an hour.

Operation 420 includes determining, e.g. by the MLCS 130, to an examination whether the simulation timeframe has ended. If the simulation timeframe has reached the end time of the simulation timeframe, the traffic simulation may be completed and operation 430 may be activated. However, if the simulation timeframe did not reach the end time, operation 440 may be activated.

Operation 430 includes determining whether traffic congestion occurred through the network during the simulation timeframe, and providing a notification or alert accordingly, e.g. via user interface screen associated with MLCS 130.

Operation 440 includes calculating, e.g. by MLC 130, for the specified simulation time, a traffic demand, a set of failures and maintenance activities scheduled based on various parameters.

In one embodiment, the MLCS 130 may consider a traffic demand at the specified simulation time and a set of failures and maintenance activities that occur during the specified simulation time. The traffic demand may include, for example, an estimated traffic during the specified simulation time based on, e.g. statistics of corresponding times, which may be received in different manners, e.g. a traffic demand matrix.

The MLCS 130 may utilize historical data, e.g. daily, weekly, monthly, in order to extract traffic patterns. Such traffic patterns may be used to project traffic at the specified simulation time, by comparing the specified simulation time to traffic historical data, e.g. data related to previous maintenance activities. If the specified simulation time represents a specific time of day and a specific date, e.g., Saturday 10:25 to Saturday 10:30, the historical data may be queried for traffic patterns for that day and time in previous weeks. In order to estimate the traffic demand, traffic during a certain time interval may be compared to traffic during the same time and day. e.g., Saturday 10:25 to Saturday 10:30, though a time period, e.g., a month, a year. The MLCS 130 may examine whether the traffic patterns for the historical data are similar to those of the specified simulation time, and the results may be included in a traffic demand estimation.

In one embodiment, when historical data indicates that previous traffic patterns may be consistently higher or lower than those of the specified simulation time, an appropriate factor may be included in the calculation and may be used to predict traffic during the specified simulation time. Such projected traffic patterns may be used to predict future demands and schedule maintenance, allocate bandwidth, etc.

The set of failures and maintenance activities may include anticipated maintenance activities and traffic-related changes, e.g. scheduled services or bandwidth calendaring, and indicate whether congestion may occur during the specified simulation time.

In another embodiment the MLCS 130 may consider other parameters to be calculated in order to perform the traffic simulation to enable setting an optimal maintenance schedule.

Operation 450 relates to generating a modified network topology in order to enable performing the maintenance activity with minimal impact on network traffic. The failed resources in IP and optical layers which may be indicated in the set of failures, e.g. a failed link, may be removed from the original topology to establish the modified network topology which does not include these resources. Several alternative modified network topologies may be generated, and MLCS 130 may select a preferred modified topology, e.g. an optimal topology, from the list of possible alternative modified topologies.

Operation 460 includes activating a traffic simulation of traffic demand on the selected modified network topology. The traffic simulation, performed for example by controller 140 or by MLCS 130, calculates, impact of the modified network topology, based on traffic demand updated before the beginning of the traffic simulation. The simulation also considers the traffic that was transferred using failed resources indicated in the original topology. The traffic simulation may include examining impending planned or unplanned maintenance activities impact on each resource and the overlap of other planned activities, which may cause traffic congestion given the current or expected traffic. The routing simulation may further include, for example, scheduled services and projected traffic based on traffic historical measurements, traffic patterns associated with a time and day and the failure conditions during the specified simulation time.

Operation 470 includes assessing a congestion on each resource in the modified network topology. The congestion may be caused, e.g., due to a combination of maintenance activities and anticipated traffic conditions. The simulated congestion an each resource may be calculated by the MLCS 130 and/or the controller 140 and may be based on network topology, e.g. a map of network inter-connects and intra-connects and on traffic statistics collected by the MLCS 130 across the network. The simulated congestion may include a congestion score or value, which may be compared to a predetermined congestion value defined by the user.

Operation 480 includes updating the specified simulation time to a new specified simulation time. The new simulation time may be selected according to an anticipated event that may affect the traffic, e.g., a beginning or an end of a maintenance activity, a planned topology change.

Arrow 490 indicates that alter performing operations 440-480, the traffic simulation may include returning to operation 420 and repeating the operations 440-480, if the simulation timeframe is not completed.

FIG. 5A-E are exemplary network state diagrams, each showing a different network state according to embodiments of the disclosed subject matter.

Figure 5A:
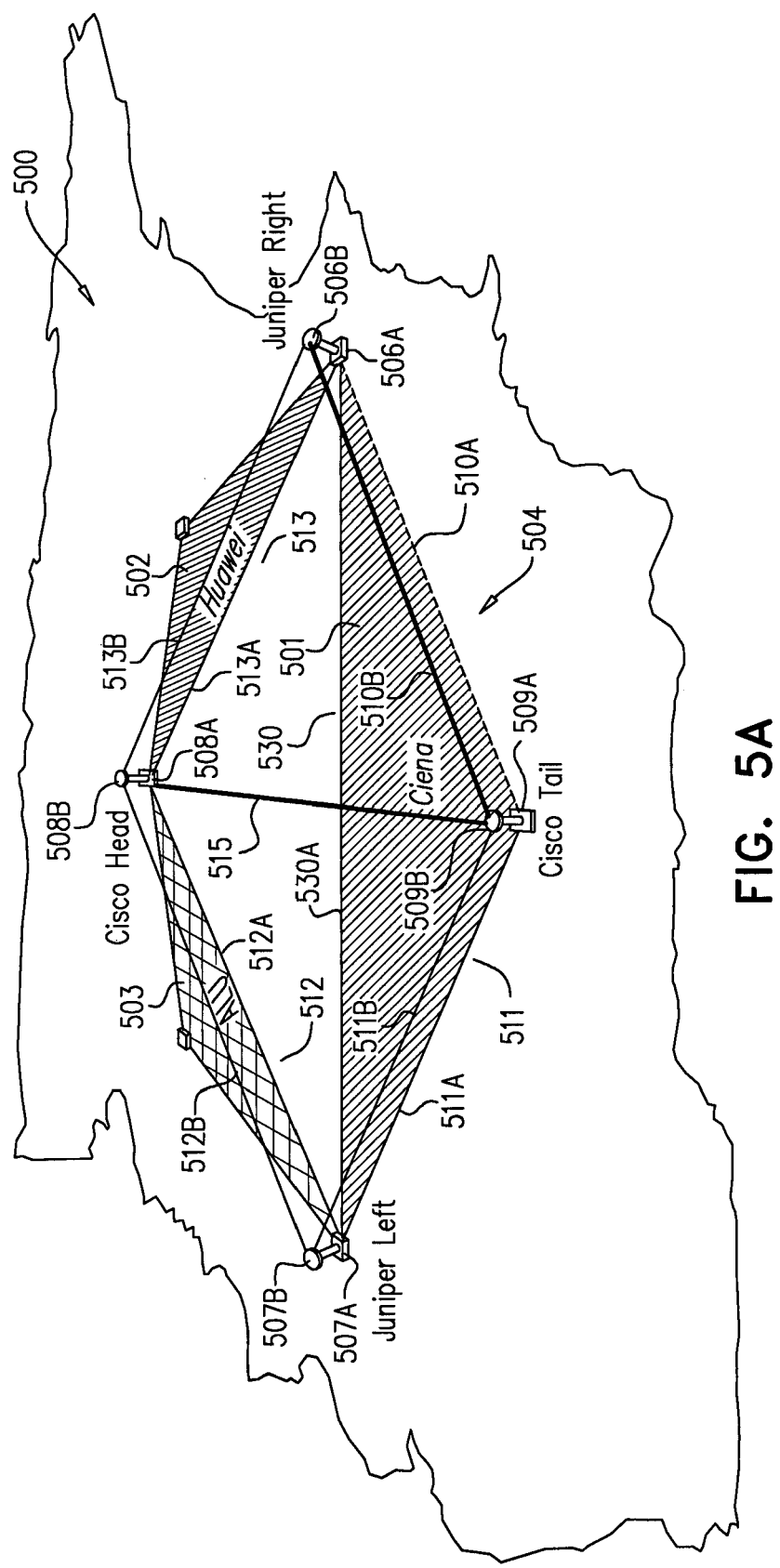

FIG. 5A shows a first network state of multi-layer network 500. An optical resource 504 is indicated as requiring a maintenance activity. The network 500 may reside in multiple geographical areas, as indicated by the background map. In the example described, nodes 506A and 506B, e.g. provided by a first supplier (e.g., Juniper Networks), may be indicated as 'Juniper right' and nodes 507A and 507B indicated as 'Juniper left'. Respectively, nodes 508A and 508B may be provided by a second supplier, e.g. Cisco Systems, Inc., and may be indicated as 'Cisco Head' and nodes 509A and 509B indicated as 'Cisco Tail'. A third supplier, e.g., Ciena Corporation, may provide the optical network in area 501. A fourth supplier, e.g. Huawei Technologies Co. Ltd, may provide the resources in area 502. A fifth supplier may provide the network hardware for area 503, etc.

Performing maintenance activity on at least a portion of the network may require calculating traffic through hardware supplied by various suppliers, and scheduling the maintenance activity according to a combined schedule of multiple network controllers that may each be associated with a network supplier. In addition, the packet switching layer and the optical layer may be controlled by one or more network operators, wherein the MLCS 130 may identify at least one timeframe suitable to the one or more network operators which the packet switching layer and the optical layer are controlled by.

The optical resource 504 may include one or more links and one or more nodes. In the present example, optical resource 504 includes an optical link 510A and nodes 506A and 509A at both ends of the link. Similarly, optical resource 511 may include optical link 511A and nodes 507A and 509A. Optical resource 512 includes an optical link 512A and nodes 507A and 508A. The optical resource 513 includes an optical link 513A and nodes 506A and 508A.

Optical link 510A may be designated for a maintenance activity, and may be indicated in a visual manner on the diagram of network 500. For example, optical link 510A may be indicated in a certain color which indicates that it is intended for a maintenance activity. The associated IP links which utilize link 510A may also be visually indicated for a user, in order to provide a visual representation of the network 500 state. For example, IP links 515 and 510B may be indicated as utilizing the optical link 510A.

The displayed network state may include a network topology (e.g. which links and nodes are active, and mapping their interconnections), a network traffic state (e.g. which links/nodes currently have a high traffic throughput, which links/nodes are congested, etc.).

Figure 5B:
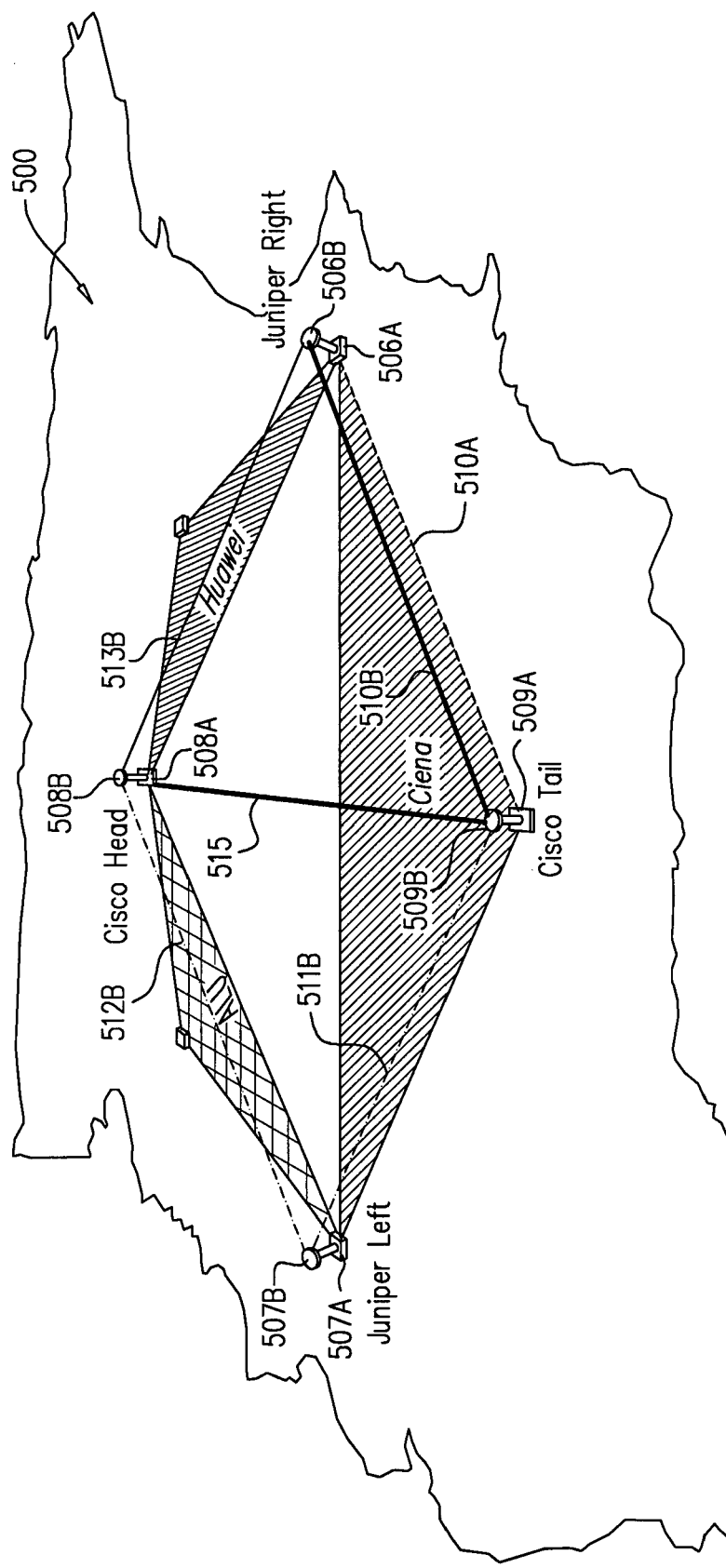

FIG. 5B is a diagram of a second network state of multi-layer network 500. This diagram indicates which IP resources and optical resources are affected due to the removal of optical link 510A. In this diagram, IP links 510B, 511B, 512B and 515 are indicated as affected by the removal of link 501A for maintenance. The removal of optical link 510A may further affect the nodes 506A/506B, 507A/507B, 508A/508B and 509A/509B. An alternative optical path must be determined in order to allow performing the maintenance activity without disrupting the traffic through the network 500.

IP links 515, 510B may be marked as cancelled or disrupted, e.g. using a visual indication (such as a certain color or type of line that marks these links). Furthermore, it may be indicated that IP links 512B and 511B are impacted by the maintenance activity and may now deliver more traffic than in the previous network traffic state indicated in FIG. 5A. Similarly, these links may be marked visually for an operator or a maintenance person to view, e.g. using a specific color or type of line. Unaffected links may be displayed as in the previous network state, e.g. link 513B.

Figure 5C:
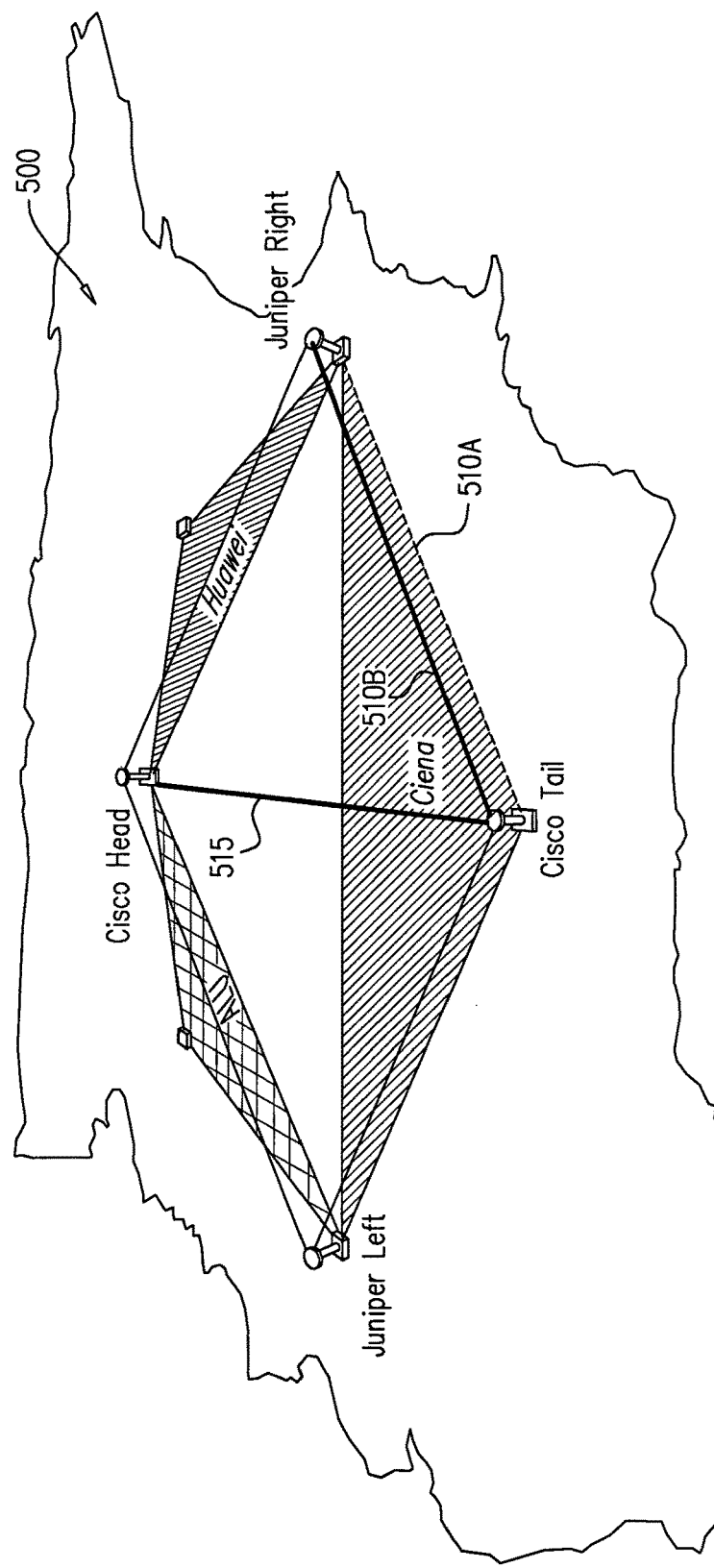

FIG. 5C is a diagram of a third network state of multi-layer network 500, according to embodiments of the present subject matter. In this diagram, the network preparation operations required prior to the maintenance activity are visually indicated. The packet switching layer may be instructed, e.g. by the MLCS 130, to remove traffic from the both if links 510B and 515. The MLCS 130 may directly (or indirectly) instruct one or more nodes, controllers, or routers of the packet switching layer, or send the instruction to controller 140 that traffic is to be removed (e.g. rerouted to a different IP path that avoids these IP links) from the both IP links 510B and 515. Optionally, an indication may be received by the MLCS 130, when the rerouting is completed and no traffic is transferred through the two IP links 510B and 515.

Figure 5D:
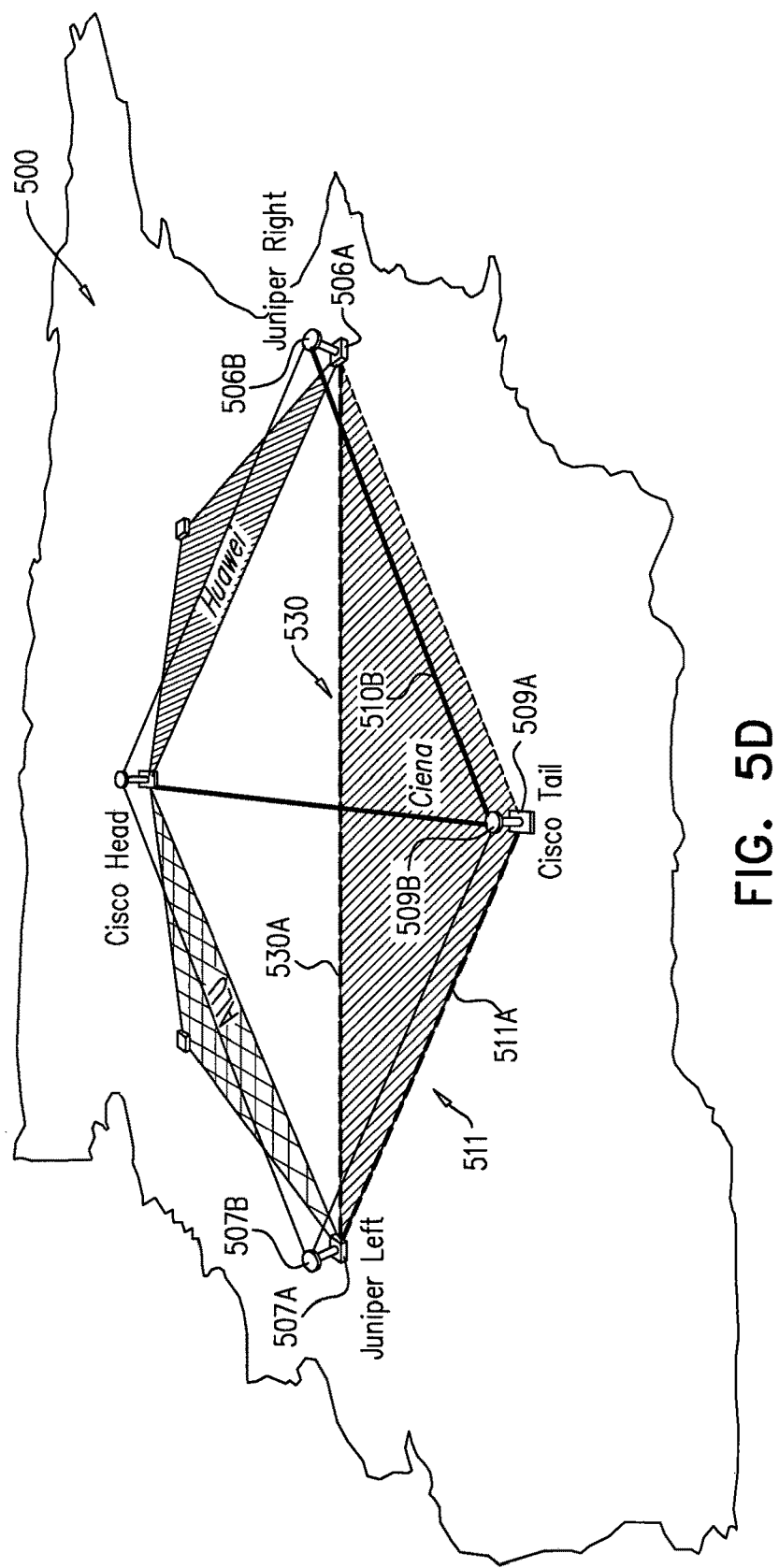

FIG. 5D is a diagram of a fourth network state of multi-layer network 500, according to embodiments of the present subject matter. In this diagram, the displayed network state visually indicates that IP link 510B is rerouted through an alternative optical path, which includes optical resources 511 and 530. These optical resources may include optical links 511A and 530A and nodes 506A, 507A, and 509A. The alternative optical path avoids the indicated optical link 510A.

After the alternative optical path is set, the MLCS 130 may provide an instruction to the optical layer to reroute traffic of the IP links 510B, by utilizing the alternative optical path which includes optical links 511A and 530A. This alternative optical path is represented as a dashed line in the diagram, while the IP link that utilizes it is represented using a thick line. Other representations may be used.

Figure 5E:
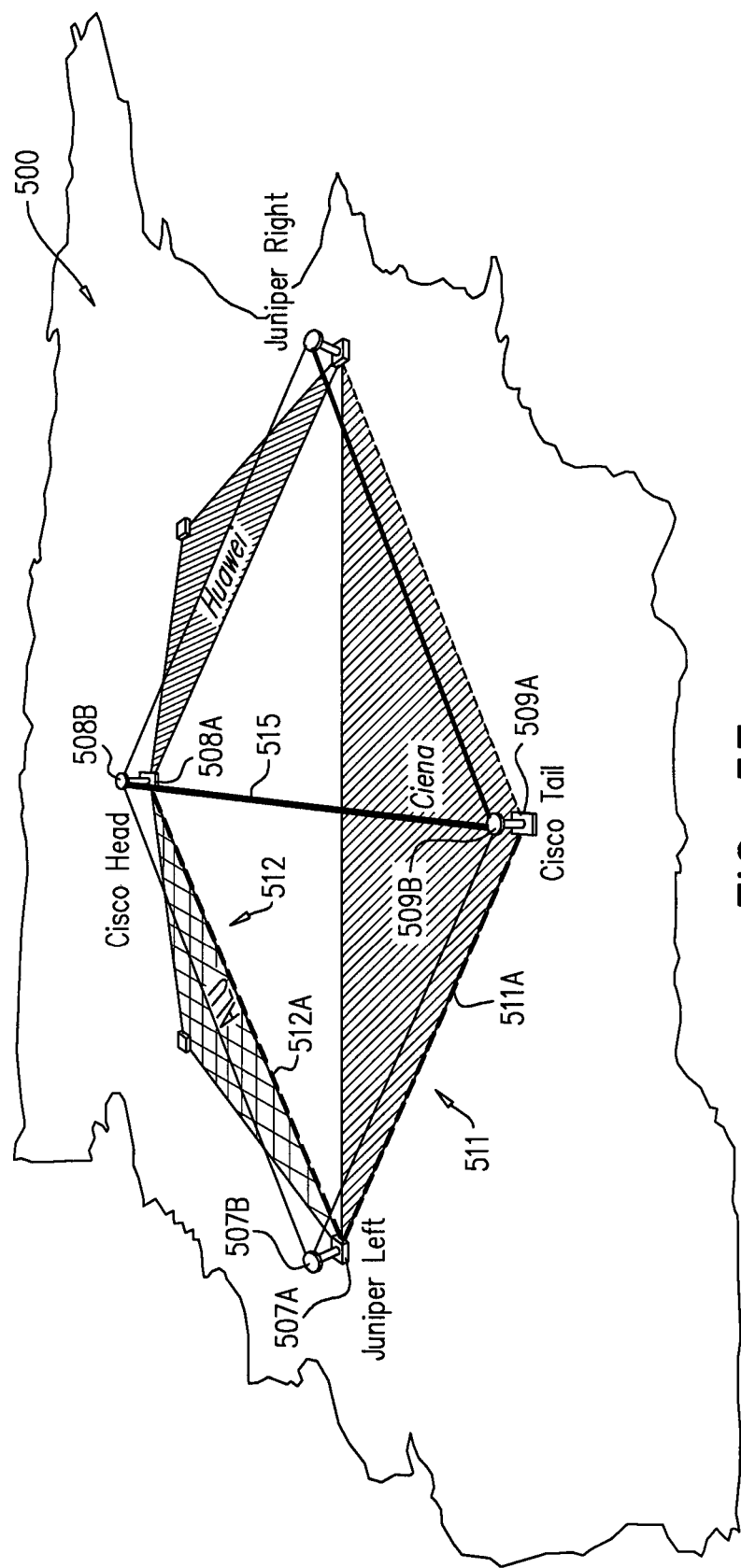

Similarly, FIG. 5E is a diagram of a fifth network slate of multi-layer network 500, according to embodiments of the present subject matter. In this diagram, the displayed network state visually indicates that IP link 515 is rerouted through an alternative optical path, which includes optical resources 511 and 512. These optical resources may include optical links 511A and 512A and nodes 509A, 507A, and 508A. The alternative optical path avoids the indicated optical link 515.

After the alternative optical path is set, the MLCS 130 may provide an instruction to the optical layer to reroute traffic of the IP link 515 by utilizing the alternative optical path which includes optical links 511A and 512A. This alternative optical path is represented as a dashed line in the diagram, while the IP link that utilizes it is represented using a thick line. Other representations may be used.

Reference is now made to FIGS. 6A and 6B, which are exemplary displays of a user interface of a NOC tool, e.g. NOC tool 120 of FIG. 1A or 1B, according to embodiments of the disclosed subject matter.

Display screen 600 of FIG. 6A is a graphic representation of a network configuration state or a network topology state. Network IP nodes 60-65 are displayed to the user over a geographical map or representation of the area in which they reside. IP Links 70-78 are displayed between the network nodes, and may be color-coded or may have another visual indicator to represent an amount or congestion of traffic that is transferred via these links. For example, IP links 71 and 75 may be marked in a first color (e.g. red) indicating that the traffic over these links is heavy or congested, while IP links 70, 78, 73, 76, 77 and 78 may be marked in a second color (e.g. green), indicating that the traffic over these links is light. Thus, an impact of a planned maintenance activity, e.g. maintenance activity 1202 of FIG. 11B, may be visually indicated in the user interface display 600.

A planned maintenance activity may be input, e.g., manually by human operators via the NOC tool 120, or may be received from the maintenance tool 110, from an external database of maintenance activities, or from another tool that is operationally connected to the MLCS 130. In order to be notified about planned maintenance activities of a different vendor, e.g. an infrastructure provider who may perform a maintenance activity, an indication, e.g. an email or another signal, may be provided by MLCS 130 to the NOC tool 120 and/or to maintenance tool 110.

A user may select various views of display screen 600, e.g., a links view 602, a traffic view 604 and hotspot view 606. The links view 602 which is shown in display screen 600 may provide a visual display of all links that are currently active in a specified network layer, e.g. packet switching layer 612.

Display screen 650 of FIG. 6B is a graphical representation of a multi-layer network mapping, e.g. a network state or a multi-layer network state, corresponding to the links view 600 of FIG. 6A. Network 652 includes a packet switching layer 612, an OTN layer 613 and an optical layer 614. These layers are connected, for example, via links 616 and 618. As indicated by selection box 651, a user of a NOC tool 120 may select a specific link, e.g. link 617, and request to view properties of the specified link, or a failure impact removing the link from the network topology. By selecting a specific link or node, a failure impact may be calculated by MLCS 130 and displayed on the user interface 650.

The user interface displays 600 and 650 provides an overall view of multi-layer network 652 and the details of layers 612 and 614. The overall network mapping view may display a current network mapping or network topology state that includes mapping between links of adjacent layers, e.g. mapping of a link 616 in layer 612 to a link 618 in layer 614.

Reference is now made to FIGS. 7A and 7B, which are additional exemplary displays of a user interface of a NOC tool, e.g. NOC tool 120 of FIG. 1A or 1B, according to embodiments of the disclosed subject matter.

Display screen 700 of FIG. 7A is a graphic representation of another network mapping or network state. Network IP nodes 60-65 (representing the same nodes of network 652 of FIGS. 6A and 6B), are displayed to the user over a geographical map or representation of the area in which they reside. In a hotspot view 606 provided in display screen 700, only congested links (e.g. links that surpassed a certain congestion threshold) may be displayed. Thus, the network congestion state that is shown in this screen includes IP links 70, 73, 75, 79 and 80. These links may be displayed using one or more predetermined colors or indications, to visually show that the amount of traffic or the congestion level that is currently transferred via these links is relatively high, e.g. above a predetermined congestion level.

FIG. 7B shows a multi-layer user interface display 750, corresponding to the network mapping view 700 shown in FIG. 7A. In display 750, a user may indicate which link is required to be removed for a planned maintenance activity, e.g. impending maintenance activity is planned for link 770 of optical layer 614.

MLCS 130 may calculate the affected resources (e.g. links or nodes) in the network, e.g. in other network layers. In the present example, MLCS 130 may provide the mapping view 750, which may visually indicate that link 771 in OTN layer 613 and links 772 and 773 in packet switching layer 612 are affected by the removal of link 770 for a planned maintenance activity.

Reference is now made to FIGS. 8A and 8B, which are additional exemplary displays of a user interface of a NOC tool, e.g. NOC tool 120 of FIG. 1A or 1B, according to embodiments of the disclosed subject matter.

User interlace display screens 800 and 850 show the same network 652 as shown in FIGS. 6A, 6B, 7A and 7B. However, the current network mapping (or network state) is shown in the display screens 800 and 850 includes the impact of the planned maintenance activity on link 770, which was designated as a candidate for maintenance by the user in screen 750. The impact of removing link 770 for maintenance includes, in the example of screen 800, additional links 81, 82 and 76 which are determined as congested links as a result of the planned maintenance activity on link 770, and accordingly are displayed in screen 800 as hotspot links.

The NOC tool 120 may also provide a simulation function, which activates simulation of a failure or a planned maintenance activity of a link or node. The simulation may be represented in color coded indications on the failed links or nodes, e.g. as shown for links 770, and 771-773 of screen 850. Other visual indications may be used to display which links in the same layer and/or in other layers of the multi-layer network (if any) will be impacted, and how the congestion in the network will increase. The displayed network state in screens 800 and 850 includes the impact of the link failure or of the maintenance activity, and aids operations of the NOC in determining whether to execute a maintenance activity, either planned or unplanned.

Reference is now made to FIGS. 9A and 9B, which schematically illustrate a table of scheduled maintenance activities 922 and a corresponding network state display 930. The network state display may include a network topology mapping or state, along with indications of the maintenance activities planned for a resource in a layer. For example, activity 910 in activities table 922, is to be performed in Office A, for resource Core Router X, and is scheduled to begin on 12 May 2014 at 10 PM and end on 13 May 2014 at 6 AM. Activity 910 may correspond to indication 931 in FIG. 9B, which is to be performed on packet switching layer 612. FIG. 9B similarly displays indication 932 which corresponds to activity 930 and is to be performed on OTN layer 613, and indication 933 which corresponds to activity 920 and is to be performed on optical layer 614.

The user interface of FIG. 9A may also include operational button 902, which allows a user to add new maintenance activities to the table 922. In one embodiment additional maintenance activities may be received from an external database of maintenance activities, or from another tool that is operationally connected to the MLCS 130. The additional maintenance activities may be added to the table 922. Operational button 904 allows removal of an activity, e.g. after it is completed or in case it is no longer required, and operational button 906, which allows a user to request NOC tool 120 to determine whether there are any conflicts in the planned activities, e.g. two maintenance activities that together may cause congestion somewhere through the network.

Reference is now made to FIG. 10A-10E, which schematically illustrate operations of a method for mapping a multi-layer network and preparing for maintenance activities of a network resource in a multi-layer network, according to embodiments of the disclosed subject matter.

The term 'network topology', when used herein, refers to the arrangement of the various network resources (e.g., links, nodes, etc.) of a multi-layer network, and its logical structure which may include how data flows within a network.

The term "network state", when used herein, refers to a topology of a network during a certain point in time, and also includes network congestion and traffic data. The network state may include a quality of service of a portion of the network or a specific network resource. The network state may indicate whether a reduced quality of service occurs when a network node is carrying more data than it can handle. The network state may also include data relating to queueing delay, packet toss or blocking of new connections.

Figure 10A:
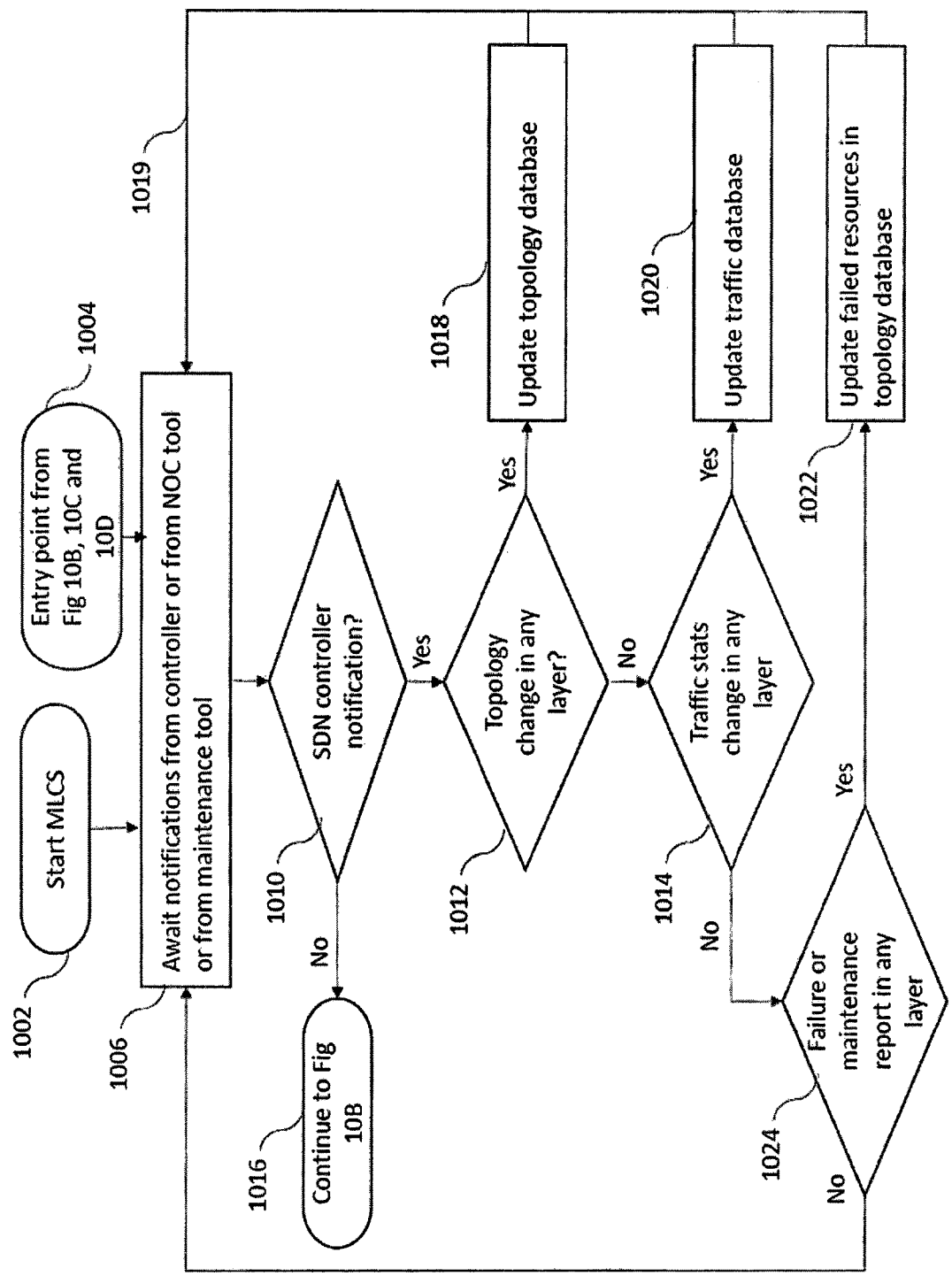

Referring to FIG. 10A, in operation 1002, the MLCS 130 (of FIG. 1A) is started, and in operation 1006 awaits to receive notifications from a network controller, e.g. controller 140 of FIG. 1A, or from a NOC tool (e.g. NOC tool 120) or from a maintenance tool (e.g. maintenance tool 110). Entry point 1004 is the entry point for operations from FIGS. 10B and 10C.

In operation 1010, the MLCS 110 may determine whether a message or a notification was received from a controller (e.g. controller 140 of FIG. 1A). A notification may include, for example, a maintenance notification, topology change notification, traffic statistics or congestion update, or another notification.

If a notification was received, it is determined in operation 1012 whether a network topology change occurred in at least one layer of the main-layer network. If a network topology change occurred, a topology database (e.g. stored in storage unit 135) is updated by the MLCS 130 in operation 1018, and the MLCS continues to monitor incoming notifications, as indicated by arrow 1019.

In operation 1014, it is determined by the MLCS 130 whether traffic statistics had changed in at least one layer of the multi-layer network. A traffic database stored in storage unit 135 of FIG. 1A/1B, may include for each traffic class (for example, best effort, business traffic, voice traffic, video traffic, etc.) a counter that represents the amount of traffic between every router to every other router in the network. The traffic database may further include a list of all traffic-engineering tunnels in the packet switching layer, optical resources and associated optical paths.

The traffic data may be updated accordingly in operation 1020, and the MLCS 130 continues to monitor notifications received from an external source, as indicated by arrow 1019.

If no traffic statistics had changed, then in operation 1024 the MLCS 130 determines whether a maintenance activity or a failure report is determined in at least one layer of the multi-layer network. If a failed resource was determined, then in operation 1022, the MLCS 130 updates the topology database to reflect the new network topology, and the MLCS 130 continues to monitor incoming notifications, as indicated by arrow 1019.

Figure 10B:
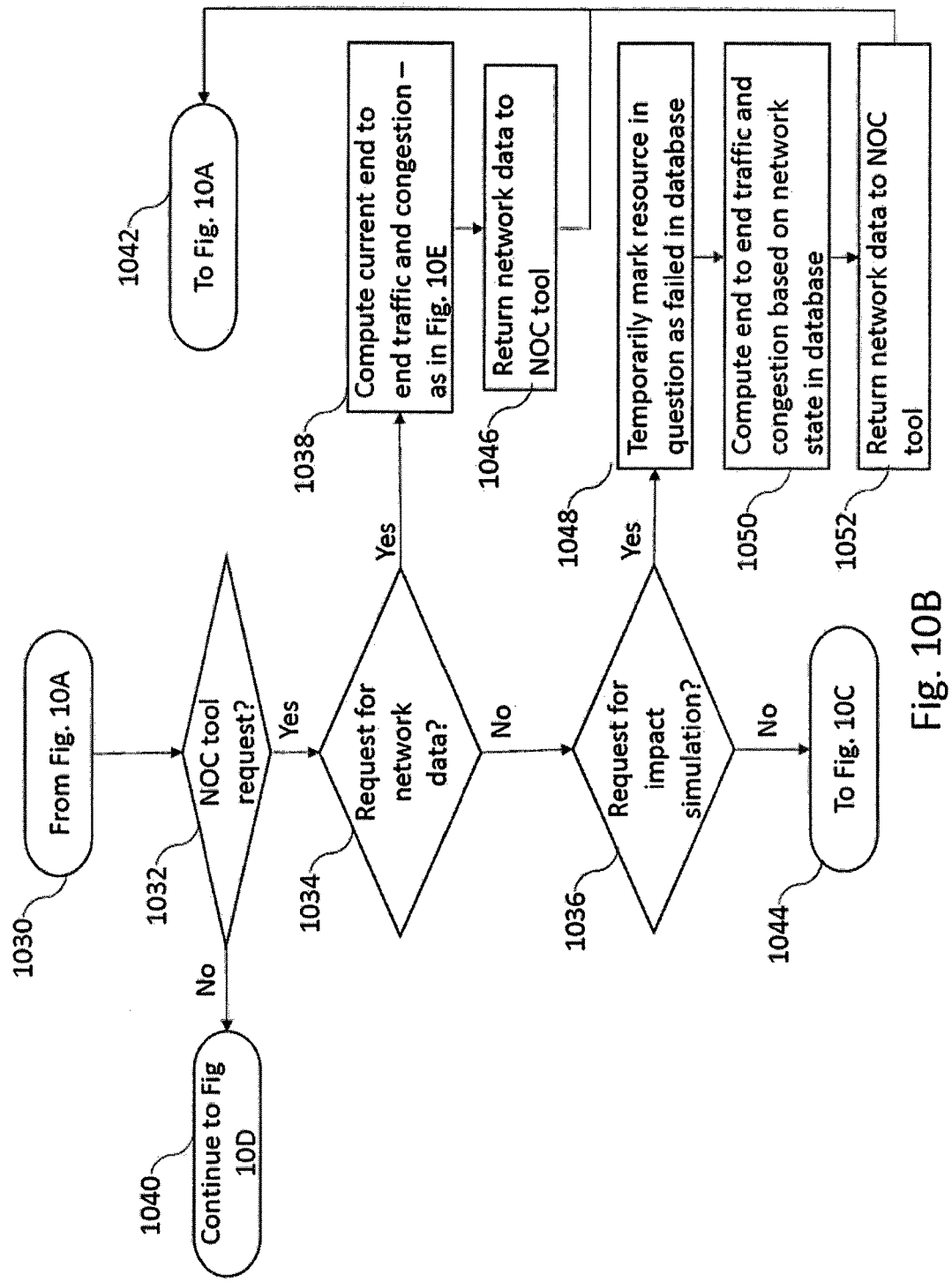

Referring now to FIG. 10B, in operation 1032, which occurs if no notification was received from controller 140, the MLCS 130 awaits a NOC tool 120 request. A request for network data may be determined in operation 1034, which may include a request to view the network traffic state and/or display an impact of a planned or ongoing maintenance activity. The MLCS 130 may compute, in operation 1038, current end-to-end traffic and congestion (to obtain an updated network state), as shown in FIG. 10E.

If the NOC tool 120 request is a determined to be an impact simulation request in operation 1036, then in operation 1048 the resource indicated in the request is temporarily marked as failed (e.g. in the topology database), and the end-to-end traffic, and congestion are computed in operation 1050, based on the network state data that may be stored in the traffic database. The computed network state may be sent to the NOC tool 120 and displayed on a user interface in operation 1052, and the MLCS 130 returns to await notifications from a controller, e.g. controller 140 (FIG. 10A), as indicated by operation 1042.

If the NOC tool 120 request is not determined to be an impact simulation request in operation 1036, then as indicated by operation 1044, the MLCS 130 continues to operation 1062 of FIG. 10C, and determines whether a maintenance acknowledge was received from the NOC tool 120. If no maintenance acknowledge was received from the NOC tool 120, then as indicated in operation 1064, the MLCS 130 continues to await notifications from a controller, e.g. controller 140 in operation 1006 of FIG. 10A.

If a maintenance acknowledge vas received from the NOC tool 120, then in operation 1066, the MLCS 130 determines the impact of the maintenance activity on the network state, by querying the traffic database to identify the affected routes and the affected ports on each router. Furthermore, in operation 1068, for each of the affected router ports, optionally, the traffic may be removed by performing one or more of the following operations:

(1) the traffic may be drained by costing out the affected resource or link (e.g., by setting an IGP metric of the link to a predetermined high value);
(2) the affected resource or link is indicated to be in maintenance mode;
(3) the optical path is rerouted, and an alternative optical path is determined such that it avoids the affected resources; and
(4) the link is marked back to be in 'normal' or active mode.

In operation 1070, the MLCS 130 awaits to receive as indication from the controller 140 that the operation requested in 1068 may be completed successfully, namely, the affected links and ports were removed from the current network topology (e.g., marked as inactive or in maintenance mode). Upon receiving the network topology indication, in operations 1072 and 1074, the NOC tool 120 is notified that the network topology proactive provision has been performed, and that the maintenance activity may be performed for the indicated resource. This provision completes the preparation of the network for the maintenance activity, thus reducing the impact of the maintenance activity on the network traffic.

In operation 1076 it is indicated that the MLCS 130 continues to await notifications from the controller 140, returning to operation 1006.

Figure 10D:
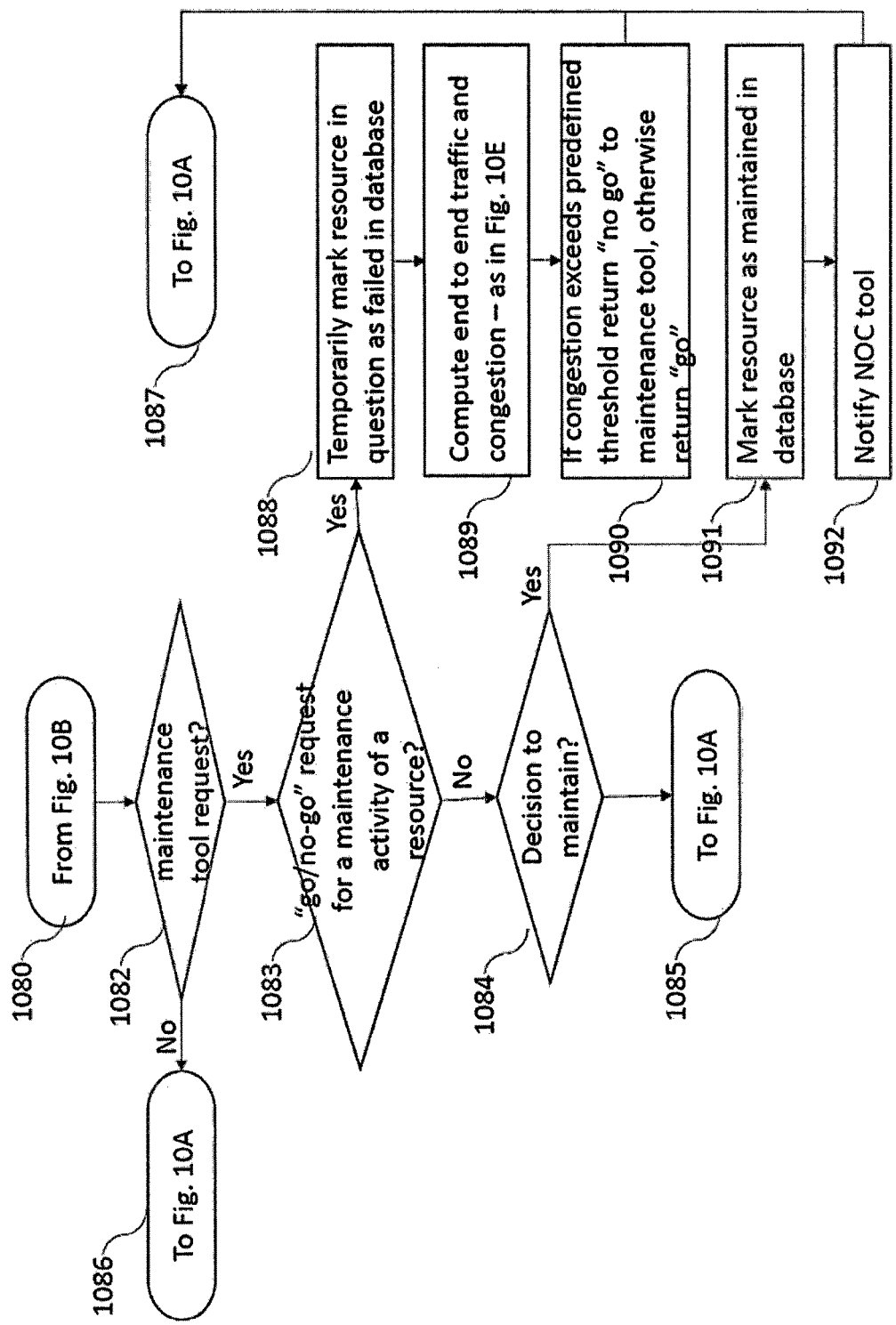

If, in operation 1032, it is determined that no NOC tool 120 request was received, then in operation 1040 the MLCS 130 continues to wait for a maintenance tool request, as indicated in operation 1082 of FIG. 10D. If no maintenance tool request was received, then in operation 1086 the MLCS 130 return to entry point 1004 of FIG. 10A.

Referring to FIG. 10D, in operation 1083 it is determined whether a request for confirmation of a maintenance activity of an indicated resource is received. If the request is received, then in operation 1088 the indicated resource is temporarily marked in the traffic database and/or the topology database as failed. In operation 1089, the end-to-end traffic and congestion are computed (sec FIG. 10E).

In operation 1090, if the congestion exceeds predefined congestion threshold, the MLCS 130 notifies the maintenance tool that the maintenance activity is not to be performed (negative confirmation). Otherwise, if the congestion does not exceed the predefined congestion threshold, the MLCS 130 notifies the maintenance tool that the maintenance activity may be performed (positive confirmation).

In operation 1091, the indicated resource to be maintained is indicated as "maintained" or in maintenance mode or inactive mode, in the traffic and/or topology databases. The NOC tool 120 is notifies in operation 1092, e.g. by displaying a message or another visual or audible indication to the operator, that the maintenance activity is allowed.

Reference is made to FIG. 10E, which discloses a method for computing current end-to-end traffic and congestion. In operation 1100, the MLCS 130 is invoked, e.g. via operation 1089 of FIG. 10D and/or operation 1038 of FIG. 10B, to determine a last valid end-to-end traffic measurement in the traffic database in operation 1093. In operation 1094, the traffic routing that is associated with the measurement of operation 1093 is ignored by the MLCS 130, in order to mask the impact of failures during the measurement period.

In operation 1095, the MLCS 330 considers and stores in the topology database, the currently known failures, e.g., with or without the impact of the proposed maintenance activity, as defined by the invoker of the end-to-end traffic and congestion computation.

A network simulation may be activated in order to assess current traffic congestion, e.g. by a traffic simulation engine, in operation 1096, taking into account the currently known failures. The simulation results are provided to the invoker of the method in operation 1097, e.g. via a notification, a message, a displayed indication, or another format.

The maintenance tool 110 may display on a user interface to the maintenance person a list of resources (router, line card, optical switch, fiber etc.) that may be maintained and are in the physical vicinity of the maintenance person (based on a list of devices provided by the MLCS 130 and maintenance person location, e.g. GPS). Alternatively, the list of devices may be based on currently pending maintenance activities, as defined by the NOC tool 120 and/or the maintenance tool 110 or both, pending maintenance activities in the vicinity of the maintenance person.

The maintenance tool 110 may determine an impact of the maintenance activity on quality of service in at least a portion of the network (e.g., the core) by using information related to current traffic, current or future maintenance activities and/or expected traffic during the next predetermine number of hours, which are the expected duration of the maintenance time frame.

The traffic information stored on the storage unit 135 may include or may be derived from historical data, e.g., traffic behavior during past several days, or based on the same day of last week. It can also be based on a combination of the current traffic and historical data—for example, the expected % change of traffic from its current level may be derived based on traffic on the same day last week, but the baseline traffic level can be based on current traffic measurement or current traffic data, e.g., relating to current maintenance activities through the network.

FIG. 11A-C are schematic illustrations of notifications and display screens of a maintenance tool, for a method for performing a network maintenance activity. FIG. 11A is an illustration of notifications and messages sent in preparation for an exemplary maintenance activity, FIG. 11B is an illustration of notifications and messages sent during a maintenance activity and FIG. 11C is an illustration of notifications and messages sent after maintenance activity, according to embodiments of the disclosed subject matter.

One method for checking the impact of a maintenance activity is to first query MLCS 130 for the list of resources that are currently down due to existing failures or maintenance activities or are expected to go down due to the current maintenance activities or vine to future maintenance activities during the expected duration of the current maintenance activity. The MLCS 130 can then be queried as to the impact of the downed resources. Query communication between the craft tool or NOC tool 120 and the MLCS 130 can be carried out using, for example, a RESTful API.

The impact simulation query triggers the MLCS 130 to activate a traffic simulation engine that simulates impact on traffic through the different layers—in particular the packet switching layer, based on the map of network topology (e.g. stored in the topology database) and on traffic statistics collected by the MLCS 130 across the network and stored in the traffic database.

The outcome of the traffic simulation analysis is an estimation of congestion in the network during the maintenance activities. If the congestion level exceeds an operator-defined congestion threshold, then the MLCS 130 will return a negative confirmation, e.g. a "red light" or "no-go" indication to the maintenance tool user interface (e.g., as shown in screen 1204 of FIG. 11A). Otherwise the MLCS 130 will return a maintenance preparation notification (e.g. a "yellow light" notification) which indicates that the maintenance person is allowed to initiate the maintenance preparation process (as shown by screen 1213 in FIG. 11B), followed by a confirmation maintenance notification (e.g., "green light" or "go"), indicating that the maintenance activity may be initiated, as shown by screen 1218 in FIG. 11B).

This process is also shown in FIG. 10D. If the maintenance person chooses to continue to perform the maintenance activity, the MLCS 130 indicates the link "at risk of going down" in the traffic and/or topology database (as shown by notification 1215 of FIG. 11B), so that a technician operating the NOC tool 120 will be notified of such a probability and act accordingly (as shown by 4 in FIG. 11B). This step is also demonstrated in FIG. 10D. Upon receipt of this indication, the craft tool will display a red/green light respectively on the GUI (as is shown by 8 in FIG. 11B).

Other notification levels can also be provided by the present system, e.g., a continuous "risk meter" that has a predetermined range of alerts according to a computed risk level, e.g. spans from red to green indications or displays a score that is associated with the risk level. For example, the risk meter may include an 'orange light' indication that a maintenance activity carries a risk which is lower than a 'red light' indication. The risk level indication may be associated and calculated according to a sensitivity of the network segment that is affected, potential financial damages related to the risk, number of risked network elements or resources that are shut down, and the like.

The maintenance person provided with a maintenance confirmation notification can validate the notification and indicate to the MLCS 130 that a pertinent network resource is about to go down (on commencing maintenance activity). This will affect the display on the NOC tool 120 (as is shown by 1204 in FIG. 11B), and can lead to identification of the to-be-affected higher layer links by the MLCS 130. The MLCS 130 can now proactively provision the network to minimize the traffic impact, e.g., by 'costing out' the higher layer IP links (as is shown by 1216 in FIG. 11B and FIG. 8C). As a result, existing traffic will drain out of these links and new traffic will be routed away from these links. The MLCS 130 will then inform the craft tool as well as the NOC tool 120 that maintenance can proceed (as is shown by 1207 in FIG. 11B).

One issue with 'costing out' all future-impacted links at the same time, is that it burdens the packet switching layer with a large number of simultaneous outages—and as such, a maintenance activity that can lead to drainage of multiple links may not be allowed to proceed. In such cases, an optical path for an IP link can be rerouted by the system after costing out the link, and then the link can be put back into service but on an optical path that circumvents the to-be-maintained resources. This process can be done gradually, link-by-link, minimizing the impact of drainage on the packet switching layer.

Reference is now made to FIG. 11C, which is a schematic illustration of notifications and display screens of a method for performing a network maintenance activity, according to embodiments of the disclosed subject matter. Once the maintenance activity is over, the maintenance person notifies the system via the maintenance took as indicated by notification 1238 sent from the maintenance tool to the MLCS 130.

The operations of preparing the network to return to the previous network state may be the same operations for preparing the network for the maintenance activity, but performed in a reverse order. Possibly, upon receiving indication of user approval, e.g., by the NOC tool 120 in notification 1232, the MLCS 130 restores the IP links that were optically rerouted to an alternative optical path, by provisioning the IP links back to their original cost in operation 1233.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing properly' implies a property of the thing, unless otherwise clearly evident from the context thereof.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a computerized system or a similar term denotes an apparatus comprising one or more processors operable or operating according to one or more programs.

As used herein, without limiting, a module represents a part of a system, such as a part of a program operating or interacting with one or more other parts on the same unit or on a different unit, or an electronic component or assembly for interacting with one or more other components.

As used herein, without limiting, a process represents a collection of operations for achieving a certain objective or an outcome.

As used herein, the term 'server' denotes a computerized apparatus, providing data and/or operational service or services to one or more other apparatuses.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

According to one aspect of the present invention there is provided a system for predicting the impact of a communication path disruption on a multi-layer network, the system comprising a computing platform configured for determining the impact of the communication path disruption on communication traffic through the multi-layer network based on: (i) a map of connections between nodes of a server layer and nodes of a client layer of the multi-layer network; (ii) a map of communication paths of the server layer; and (iii) time-related data on communication traffic through the multi-layer network.

According to further features in preferred embodiments of the invention described below, the computing platform is further configured for determining the impact of the communication path disruption on communication traffic through the multi-layer network based on: (iv) maintenance activity in the multi-layer network.

According to still further features in the described preferred embodiments the computing platform is further configured for determining the impact of the communication path disruption on communication traffic through the multi-layer network based on a projected spike in the communication traffic.

According to still further features in the described preferred embodiments the time-related data communication traffic through the multi-layer network is historical data or real time data.

According to still further features in the described preferred embodiments the time-related-data on communication traffic through the multi-layer network is modeled data or known future change in traffic due to scheduled "bandwidth on demand" services.

According to still further features in the described preferred embodiments the communication path disruption is caused by unscheduled maintenance or service activity.

According to still further features in the described preferred embodiments the computing platform further comprises a scheduler for identifying time frames for the maintenance or service activity based on the impact of the maintenance or service activity on the multi-layer network.

According to still further features in the described preferred embodiments the computing platform maps the communication path disruption to the server layer using (ii) and correlates links of the client layer affected by the communication path disruption to the nodes or links of the server layer of the multi-layer network using (i) thereby identifying the links of the client layer affected by the communication path disruption.

According to still further features in the described preferred embodiments the computing platform further correlates links of the client layer affected by the communication path disruption to (iii) to thereby determine the impact of the communication path disruption on the communication traffic through the multi-layer network.

According to still further features in the described preferred embodiments the computing platform uses (iii) to estimate current traffic conditions based on historical communication traffic measurements and present failure conditions.

According to still further features in the described preferred embodiments the computing platform utilizes the estimate of current traffic conditions to simulate communication traffic flow through the multi-layer network.

According to still further features in the described preferred embodiments the communication path disruption is caused by scheduled maintenance or service activity and the computing platform can affect rerouting of IP traffic in the multi-layer network to minimize the impact of the disruption on the multi-layer network.

According to another aspect of the present invention there is provided a system for minimizing impact of a maintenance activity on a multi-layer network, the system comprising a computing platform configured for: (a) determining an impact of the maintenance activity on the multi-layer network; (b) reconfiguring the multi-layer network by: (i) causing the packet switching layer to stop using an IP link, thereby taking it out of service without negatively affecting the network; (ii) rerouting the optical path supporting the IP link affected by the maintenance activity to thereby circumvents the to-be-maintained resources; and (iii) configuring a packet switching layer of the multi-layer network to utilize the IP link.

According to still further features in the described preferred embodiments the system further comprises: (c) repeating (b) for a plurality of IP links affected by the maintenance activity.

According to still further features in the described preferred embodiments (c) is affected in a stepwise manner for each IP link of the plurality of IP links to thereby avoid simultaneous outage of several IP links.

The present invention successfully addresses the shortcomings of the presently known configurations by providing a system which is capable of providing maintenance scheduling in a multi-layer network.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

The invention claimed is:

1. A computerized system for performing preparation operations for a maintenance activity that causes a disruption in a communication path of traffic over a multi-layer network, wherein the multi-layer network comprises a packet switching layer and an optical layer, wherein the packet switching layer comprises one or more IP links and one or more IP nodes, wherein the optical layer comprises one or more optical links and one or more optical nodes, the system comprising:

a maintenance tool configured to coordinate maintenance activities of the multi-layer network based on maintenance activity data, wherein the maintenance activity data comprises at least a network traffic state, a network topology and a maintenance activity state;

a storage unit to store the maintenance activity data; and a multi-layer control system comprising a processor, wherein said processor is configured to:

a. receive from the maintenance tool an indication that one or more maintenance activities are required on an indicated optical resource, wherein the indicated optical resource comprises at least an optical link or an optical node or a part of a node;

b. simulate whether the one or more maintenance activities and anticipated traffic conditions will cause traffic congestion in the multi-layer network;

c. determine an affected optical path, said affected optical path utilizing bandwidth resources associated with optical links and nodes, wherein said affected optical path utilizes the indicated optical resource;

d. determine an affected IP link utilizing said affected optical path;

e. remove traffic from the affected IP link by rerouting traffic through one or more alternative IP links;

f. receive an indication that no traffic is transferred via the affected IP link;

g. remove the affected optical path by releasing the bandwidth resources utilized by the affected optical path;

h. activate an alternative optical path, wherein the alternative optical path circumvents the indicated optical resource;

i. configure the packet switching layer to utilize the alternative optical path, by associating bandwidth resources in optical nodes and links of the alternative optical path to corresponding IP nodes and links of the packet switching layer, in order to reroute traffic transferred via the affected IP link to pass through the alternative optical path;

j. repeat operations (c)-(i) for each affected optical path and each affected IP link; and k. provide an indication to a maintenance person via the maintenance tool that the maintenance activity is permitted.

2. The system according to claim 1, wherein the maintenance tool comprises a maintenance tool display unit to display the maintenance activity data.

3. The system according to claim 1, wherein the processor is further configured to indicate that the alternative optical path has been determined and the maintenance activity should proceed.

4. The system according to claim 1, wherein the processor is further configured to calculate an updated network traffic measurement by combining current traffic data and historical traffic data, wherein the current traffic data comprises data related to current maintenance activities and the historical traffic data comprises data related to previous maintenance activities.

5. The system according to claim 4, wherein the processor is further configured to identify at least one suitable timeframe to schedule the maintenance activity, wherein a suitable timeframe is calculated according to current traffic data and the historical traffic data.

6. The computerized system according to claim 1, wherein said processor is configured to
update properties associated with the affected IP link in order to reflect characteristics of the alternative optical path, said properties including at least one of the following: latency, distance, affinity value and shared risk link groups (SRLG).

7. A computerized method for performing preparation operations for a maintenance activity that causes a disruption in a communication path of traffic over a multi-layer network, wherein the multi-layer network comprises layer and an optical layer, wherein the packet switching layer comprises one or more IP links and one or more IP nodes, wherein the optical layer comprises one or more optical links and one or more optical nodes, the method comprising:
coordinating, by a maintenance tool, maintenance activities of the multi-layer network based on maintenance activity data, wherein the maintenance activity data comprises at least a network traffic state, a network topology and a maintenance activity state;
storing, by a storage unit, the maintenance activity data; and
performing, by a processor of a multi-layer control system, the operations:
 a. receiving, from the maintenance tool, an indication that one or more maintenance activities are required on an indicated optical resource, wherein the indicated optical resource comprises at least an optical link or an optical node or a part of a node;
 b. simulating whether the one or more maintenance activities and anticipated traffic conditions will cause traffic congestion in the multi-layer network
 c. determining an affected optical path, said affected optical path utilizing bandwidth resources associated with optical links and nodes, wherein said affected optical path utilizes the indicated optical resource;
 d. determining an affected IP link utilizing said affected optical path;
 e. removing traffic from the affected IP link by rerouting traffic through one or more alternative IP links;
 f. receiving an indication that no traffic is transferred via the affected IP link;
 g. removing the affected optical path by releasing the bandwidth resources utilized by the affected optical path;
 h. activating an alternative optical path, wherein the alternative optical path circumvents the indicated optical resource;
 i. configuring the packet switching layer to utilize the alternative optical path, by associating bandwidth resources in optical nodes and links of the alternative optical path to corresponding IP nodes and links of the packet switching layer, in order to reroute traffic transferred via the affected IP link to pass through the alternative optical path;
 j. repeating operations (c)-(i) for each affected optical path and each affected IP link; and
 k. providing an indication to a maintenance person via the maintenance tool that the maintenance activity is permitted.

8. The method according to claim 7, further comprising displaying, by a maintenance tool display unit, at least a portion maintenance activity data.

9. The method according to claim 7, further comprising, indicating, by the processor, that the alternative optical path has been determined and the maintenance activity should proceed.

10. The method according to claim 7, further comprising calculating, by the processor, an updated network traffic measurement by combining current traffic data and historical traffic data, wherein the current traffic data comprises data related to current maintenance activities and the historical traffic data comprises data related to previous maintenance activities.

11. The method according to claim 10, further comprising identifying, by the processor, at least one suitable timeframe to schedule the maintenance activity, wherein a suitable timeframe is calculated according to current traffic data and the historical traffic data.

12. The method of claim 7, further comprising updating, by the processor, properties associated with the affected IP link in order to reflect characteristics of the alternative optical path, said properties including at least one of the following: latency, distance and shared risk link groups (SRLG).

* * * * *